US006800722B2

(12) United States Patent
Pei

(10) Patent No.: US 6,800,722 B2
(45) Date of Patent: Oct. 5, 2004

(54) ELECTROLUMINESCENT POLYMERS AND USE THEREOF IN LIGHT-EMITTING DEVICES

(75) Inventor: Qibing Pei, Fremont, CA (US)

(73) Assignee: SRI International, Menlo Park, CA (US)

(*) Notice: Subject to any disclaimer, the term of this patent is extended or adjusted under 35 U.S.C. 154(b) by 98 days.

(21) Appl. No.: 10/153,229

(22) Filed: May 21, 2002

(65) Prior Publication Data

US 2003/0013843 A1 Jan. 16, 2003

Related U.S. Application Data

(63) Continuation-in-part of application No. 09/864,704, filed on May 23, 2001, now Pat. No. 6,723,828.

(51) Int. Cl.[7] .................. C08G 73/00; C08G 73/06
(52) U.S. Cl. .................. 528/423; 528/422; 528/486; 428/690; 428/917
(58) Field of Search ................ 528/423, 422, 528/486; 428/696, 917

(56) References Cited

U.S. PATENT DOCUMENTS

| 4,801,517 A | 1/1989 | Frechet et al. |
| 4,818,650 A | 4/1989 | Limburg et al. |
| 5,534,613 A | 7/1996 | Tan et al. |

(List continued on next page.)

FOREIGN PATENT DOCUMENTS

| WO | WO 98/27136 | 6/1998 |
| WO | WO 99/21936 | 5/1999 |
| WO | WO 01/34682 | 5/2001 |
| WO | WO 02/26859 | 4/2002 |

OTHER PUBLICATIONS

Chang et al. (1998), "Dual–Color Polymer Light–Emitting Pixels Processed by Hybrid Ink–Jet Printing," *Applied Physics Letters* 73(18):2561–2563 (abstract only printed from *Chemical Abstracts* 130:45177).

(List continued on next page.)

*Primary Examiner*—Duc Truong
(74) *Attorney, Agent, or Firm*—Reed & Eberle LLP; Dianne E. Reed; Mark L. Warzel

(57) ABSTRACT

The invention provides conjugated polymers that have good solubility and semiconductivity, and that display high photoluminescent and electroluminescent efficiency. Representative polymers containing monomer units having the general structure of formula (I):

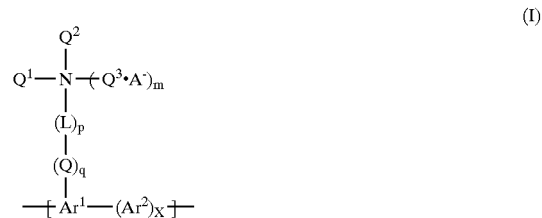

wherein: $Ar^1$ and $Ar^2$ are independently selected from the group consisting of monocyclic, bicyclic and polycyclic arylene, heteroarylene, substituted arylene and substituted heteroarylene groups; L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof; Q is a heteroatom; m is zero or 1; p is zero or 1, and q is zero or 1, with the proviso that when p is zero, then q is zero; x is zero or 1; $Q^1$ and $Q^2$ are independently selected from the group consisting of H, aryl, heteroaryl, substituted aryl, substituted heteroaryl, alkyl, substituted alkyl, heteroalkyl, and substituted heteroalkyl, and $Q^3$ is selected from the group consisting of alkyl, substituted alkyl, heteroalkyl, and substituted heteroalkyl, with the proviso that when m is 1, $Q^1$ and $Q^2$ are other than H; and $A^-$ is a negatively charged counterion. Electroluminescent and other devices containing a polymer of the invention are also provided.

26 Claims, 3 Drawing Sheets

U.S. PATENT DOCUMENTS

| | | |
|---|---|---|
| 5,558,904 A | 9/1996 | Hsieh et al. |
| 5,604,292 A | 2/1997 | Stenger-Smith et al. |
| 5,708,130 A | 1/1998 | Woo et al. |
| 5,723,671 A | 3/1998 | Goodbrand et al. |
| 5,726,457 A | 3/1998 | Nakano et al. |
| 5,777,070 A | 7/1998 | Inbasekaran et al. |
| 5,814,244 A | 9/1998 | Kreuder et al. |
| 5,858,563 A | 1/1999 | Sano et al. |
| 5,900,327 A | 5/1999 | Pei et al. |
| 5,998,045 A | 12/1999 | Chen et al. |
| 6,087,467 A | 7/2000 | Marrocco, III et al. |
| 6,097,147 A | 8/2000 | Baldo et al. |
| 6,114,490 A | 9/2000 | Kreuder et al. |
| 6,166,489 A | 12/2000 | Thompson et al. |
| 6,169,163 B1 | 1/2001 | Woo et al. |
| 6,303,238 B1 | 10/2001 | Thompson et al. |
| 6,312,836 B1 | 11/2001 | Bulovic et al. |
| 6,333,521 B1 | 12/2001 | Thompson et al. |
| 6,387,544 B1 | 5/2002 | Thompson et al. |
| 6,391,482 B1 | 5/2002 | Matsuo et al. |
| 2001/0053463 A1 | 12/2001 | Thompson et al. |
| 2002/0034656 A1 | 3/2002 | Thompson et al. |
| 2002/0045061 A1 | 4/2002 | Hosokawa |

OTHER PUBLICATIONS

Chang et al. (1998), "Dual–Color Polymer Light–Emitting Pixels Processed by Hybrid Inkjet Printing," Proceedings of SPIE—The International Society for Optical engineering, p. 3476 (abstract only printed from *Chemical Abstracts* 130:359212).

Nothofer et al. (2000), "Liquid Crystalline Polyfluorenes for Blue Polarized Electroluminescence," Macromolecular Symposia 154: 139–148 (abstract only printed from *Chemical Abstracts* 133:141917).

Kraft et al. (1998), "Electroluminescent Conjugated Polymers–Seeing Polymers in a New Light," *Angew: Chem. Int. Ed.* 37:402–428.

Rehahn et al. (1989), "Soluble Poly(Para–Phenylene)s. 1. Extension of the Yamamoto Synthesis to Dibromobenzenes Substituted with Flexible Side Chains," *Polymer* 30:1054–1059.

Yang et al. (1996), "Efficient Blue Polymer Light–Emitting Diodes from a Series of Soluble Poly(Paraphenylene)s," *J. Appl. Phys.* 79(2):934–939.

Babayan et al. (2001), "Substitutent Effects and Excimer Formation in Platinum Complexes," *3$^{rd}$ International Conference on Electroluminescence of Molecular Materials and Related Phenomena, Program and Abstracts*, p. P–100, UCLA Sunset Village, Los Angeles, CA.

Chang et al. (2001), "The Search of Polymeric Hosts for Polymer Phosphorescent Light–Emitting Diodes," *3$^{rd}$ International Conference on Electroluminescene of Molecular Materials and Related Phenomena, Program and Abstracts*, p. O–17, UCLA Sunset Village, Los Angeles, CA.

Das et al. (2001), "Polymer Phosphorescence Device Using a New Green Emitting Ir(III) Complex," *3$^{rd}$ International Conference on Electroluminescence of Molecular Materials and Related Phenomena, Program and Abstracts*, p. P–61, UCLA Sunset Village, Los Angeles, CA.

Djurovich et al. (2001), "The Phosphorescent Blues: New Iridium Based Lumiphores for High Efficiency Blue OLEDs," *3$^{rd}$ International Conference on Electroluminescence of Molecular Materials and Related Phenomena, Program and Abstracts*, p. P–45, UCLA Sunset Village, Los Angeles, CA.

Kwong et al. (2001), "Long Lifetime Electrophosphorescent Devices," *3$^{rd}$ International Conference on Electroluminescence of Molecular Materials and Related Phenomena, Program and Abstracts*, p. O–15, UCLA Sunset Village, Los Angeles, CA.

McGehee et al. (1999), "Narrow Bandwidth Luminescence from Blends with Energy Transfer from Semiconducting Conjugated Polymers to Europium Complexes," *Advanced Materials* 11(16):1349–1354.

Murphy et al. (2001), "Phosphorescent Cyclometalated Iridium Complexes: Synthesis, Photophysics, and Electroluminescence," *3$^{rd}$ International Conference on Electroluminescence of Molecular Materials and Related Phenomena, Program and Abstracts*, p. O–19, UCLA Sunset Village, Los Angeles, CA.

Pu et al. (2001), "Highly Emissive Polymer Light–Emitting Diodes Based on a Novel Triphenylamine–Substituted Poly(1,4–phenylene vinylene)s," *3$^{rd}$ International Conference on Electroluminescence of Molecular Materials and Related Phenomena, Program and Abstracts*, p. P–14, UCLA Sunset Village, Los Angeles, CA.

Sage et al. (2001), "Triplet Emission of a Hydrocarbon Doped OLED," *3$^{rd}$ International Conference on Electroluminescence of Molecular Materials and Related Phenomena, Program and Abstracts*, p. P–77, UCLA Sunset Village, Los Angeles, CA.

Schanze et al. (2001), "Near–Infrared Electroluminescence from Conjugated Polymer/Lanthanide Porphyrin Blends," *3$^{rd}$ International Conference on Electroluminescence of Molecular Materials and Related Phenomena, Program and Abstracts*, p. P–99, UCLA Sunset Village, Los Angeles, CA.

ELECTROLUMINESCENT POLYMERS AND USE THEREOF IN LIGHT-EMITTING DEVICES

CROSS-REFERENCE TO RELATED APPLICATIONS

This application is a continuation-in-part of U.S. Ser. No. 09/864,704, filed May 23, 2001, now U.S. Pat. No. 6,723,828, the disclosure of which is incorporated by reference.

REFERENCE TO GOVERNMENT SUPPORT

This invention was funded in part by the United States Office of Naval Research under Contract No. N00014-99-C-0274. The United States Government may have certain rights in this invention.

TECHNICAL FIELD

This invention relates generally to the field of conjugated polymers, and more particularly relates to a novel class of conjugated electroluminescent polymers useful as semiconductive materials in electroluminescence devices and the like.

BACKGROUND

"Conjugated" polymers are polymers containing a π-electron conjugated system along the main chain (or "backbone"), and have been known for some time to have utility as organic semiconducting materials. See, e.g., *Organic Conductors*, ch. 11, J. P. Farger, Ed. (New York, N.Y.: Marcel Dekker, 1994). Conjugated polymers include, for example, cis and trans polyacetylenes, polydiacetylenes, polyparaphenylenes, polypyrroles, polythiophenes, polybithiophenes, polyisothianaphthene, polyphenylenevinylenes, polythienylvinylenes, polyphenylenesulfide, and polyaniline. More recently, conjugated polymers have also been discovered to be useful as electroluminescent materials, i.e., as materials that emit light when excited by application of an electric current (Burroughs et al. (1990) *Nature* 347:539–541; May (1995) *Phys. World* 8(3):52–57). Accordingly, these polymers have been proposed for use in a variety of applications. For example, conjugated polymers may be used as the active material in semiconductor thin film devices such as light-emitting diodes (LEDs), transistors, photodetectors and solar cells. Conjugated polymers may also be used in electrochemical devices such as rechargeable batteries and light emitting electrochemical cells (both as thin films and in solution), as electrochemical sensors, and as electrical conductors (after being heavily doped).

The most promising application for conjugated polymers is in electroluminescent displays. Red, green, and blue emissions from conjugated polymers have all been demonstrated. Currently, red and green polymer LEDs are sufficiently bright, efficient, and stable for a number of display applications, whereas blue polymer LEDs lag in power efficiency and lifetime. Blue light emitting polymers are for the most part based on poly(paraphenylene) (PPP) and poly(fluorene), which is itself a type of poly(paraphenylene) except that every two neighboring phenyl rings are locked in one plane. Other blue light emitting polymers include alkoxy-substituted PPP, as disclosed by Yang et al. (1996), "Efficient Blue Polymer Light-Emitting Diodes from a Series of Soluble Poly(paraphenylene)s," *J. Appl. Phys.* 79(2):934–939. Polyfluorenes with 9,9-dialkyl side groups are currently the best performing blue polymers, and are described, for example, in U.S. Pat. No. 5,900,327 to Pei et al. and U.S. Pat. No. 6,169,163 to Woo et al. Compared to red- and green-emitting polymers, however, blue-emitting polymers still lag in power efficiency (thus requiring a high operating voltage) and lifetime (i.e., the spectrum is not stable and tends to red-shift with time, heat, and operation). The problems stem from the dialkyl side groups, which reduce the polymers' glass transition temperature. The fluorene rings tend to aggregate, forming intraband defects that cause the color shift toward red.

There is accordingly a need in the art for blue-emitting polymers that have high blue luminescence, decreasing the required operating voltage for a blue polymer LED. Ideal polymers would also be conjugated, semiconductive polymers that are soluble in common organic solvents, particularly those used in semiconductor processing, but nevertheless retain semiconductivity, photoluminescence and electroluminescence efficiency, tensile strength, and thermal, chemical and photochemical stability. It would also be desirable to provide such polymers that may be easily modified so as to emit light in the red and green wavelength ranges.

SUMMARY OF THE INVENTION

The present invention is addressed to the aforementioned need in the art, and provides a novel family of conjugated electroluminescent polymers useful in a variety of applications, including fabrication of semiconductor thin film devices (e.g., LEDs, transistors, photodetectors and solar cells) and electrochemical devices (e.g., rechargeable batteries, light-emitting electrochemical cells, and electrochemical sensors).

It is another object of the invention to provide such polymers in the form of electroluminescent amino-substituted conjugated polymers, copolymers, and analogs thereof.

It is another object of the invention to provide such polymers in the form of substituted poly(paraphenylenes).

It is still another object of the invention to provide such polymers wherein the polymers are blue light emitting.

It is an additional object of the invention to provide electroluminescence devices containing a polymer of the invention as the electroluminescent material.

It is a further object of the invention to provide other types of semiconductor thin film devices and electrochemical devices fabricated with a polymer of the invention.

Additional objects, advantages and novel features of the invention will be set forth in part in the description which follows, and in part will become apparent to those skilled in the art upon examination of the following, or may be learned by practice of the invention.

In one embodiment, a conjugated electroluminescent polymer is provided containing monomer units having the general structure of formula (I):

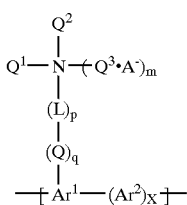

(I)

wherein:

Ar$^1$ and Ar$^2$ are independently selected from the group consisting of monocyclic, bicyclic and polycyclic arylene, heteroarylene, substituted arylene and substituted heteroarylene groups;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof;

Q is a heteroatom;

m is zero or 1;

p is zero or 1, and q is zero or 1, with the proviso that when p is zero, then q is zero;

x is zero or 1;

Q$^1$ and Q$^2$ are independently selected from the group consisting of H, aryl, heteroaryl, substituted aryl, substituted heteroaryl, alkyl, substituted alkyl, heteroalkyl, and substituted heteroalkyl, and Q$^3$ is selected from the group consisting of alkyl, substituted alkyl, heteroalkyl, and substituted heteroalkyl, with the proviso that when m is 1, Q$^1$ and Q$^2$ are other than H; and A$^-$ is a negatively charged counterion.

It will be appreciated that given the definitions of Q$^1$, Q$^2$, Q$^3$, m and A$^-$, the polymer may be substituted with a primary amino group, a secondary amino group, a tertiary amino group, or a quaternary amine salt. Diarylamino substituents are preferred (wherein m is zero and Q$^1$ and Q$^2$ are aryl, heteroaryl, substituted aryl, or substituted heteroaryl), with diarylamino-substituted poly(paraphenylenes) and copolymers and analogs thereof particularly preferred.

In a preferred embodiment, the electroluminescent polymers are comprised of monomer units having the structure of formula (II):

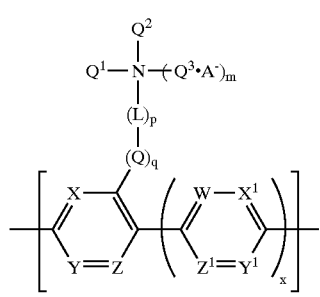

(II)

wherein:

L, Q, m, p, q, x, Q$^1$, Q$^2$, Q$^3$ and A$^-$ are as defined above; and

W, X, Y, Z, X$^1$, y$^1$, and Z$^1$ are independently selected from the group consisting of N, CH, and CR$^1$, wherein R$^1$ is —(Q)$_q$—(L)$_p$—N(Q$^1$Q$^2$), —(Q)$_q$—(L)$_p$—N(Q$^1$Q$^2$Q$^3$)$^+$A$^-$, —NO$_2$, sulfo (—SO$_3$H), carboxyl (—COOH), phosphono (—O(PO)(OH)$_2$), sulfonato (—SO$_2$—O$^-$), carboxylato (—COO$^-$), phosphonato (—P(O)(O$^-$)$_2$), —CN, halo, C$_1$–C$_{20}$ hydrocarbyl, substituted C$_1$–C$_{20}$ hydrocarbyl, heteroatom-containing C$_1$–C$_{20}$ hydrocarbyl, or substituted heteroatom-containing C$_1$–C$_{20}$ hydrocarbyl, and further wherein Z and Z$^1$ may be linked to form a cyclic group. When any of W, X, Y, Z, X$^1$, Y$^1$, and Z$^1$ is charged, as in the anionic sulfonato, carboxylato, and phosphonato groups, it will be appreciated that the charged atom or group is associated with a suitable counterion, e.g., a metal cation, the ammonium ion —NH$_4^+$, or the like.

In another embodiment, a copolymer is provided comprising at least one first monomer unit having the structure of formula (I), preferably having the structure of formula (II), and at least one second monomer unit comprised of a vinylene unit or a monocyclic, bicyclic, or polycyclic arylene, heteroarylene, substituted arylene or substituted heteroarylene unit. The copolymer may be a alternating copolymer, a random copolymer, or an alternating copolymer.

In a further embodiment, electroluminescence devices are provided that contain a polymer of the invention as the electroluminescent material. In some embodiments, it is desirable to incorporate phosphorescent dyes or other additives into the polymer for use in electroluminescence devices. These devices include light-emitting diodes (LEDs), photodetector devices, and light-emitting electrochemical cells. In a particularly preferred embodiment, an electroluminescence device prepared with a polymer of the invention is a cavity-emission electroluminescence device.

In an additional embodiment, other types of devices are provided that are fabricated with a polymer of the invention, particularly photovoltaic devices used for the generation of electrical power, electrochemical sensors used for detecting and/or quantitating chemical and/or biological materials, and transistors, e.g., field-effect transistors (FETs).

DETAILED DESCRIPTION OF THE INVENTION

Figure 1:
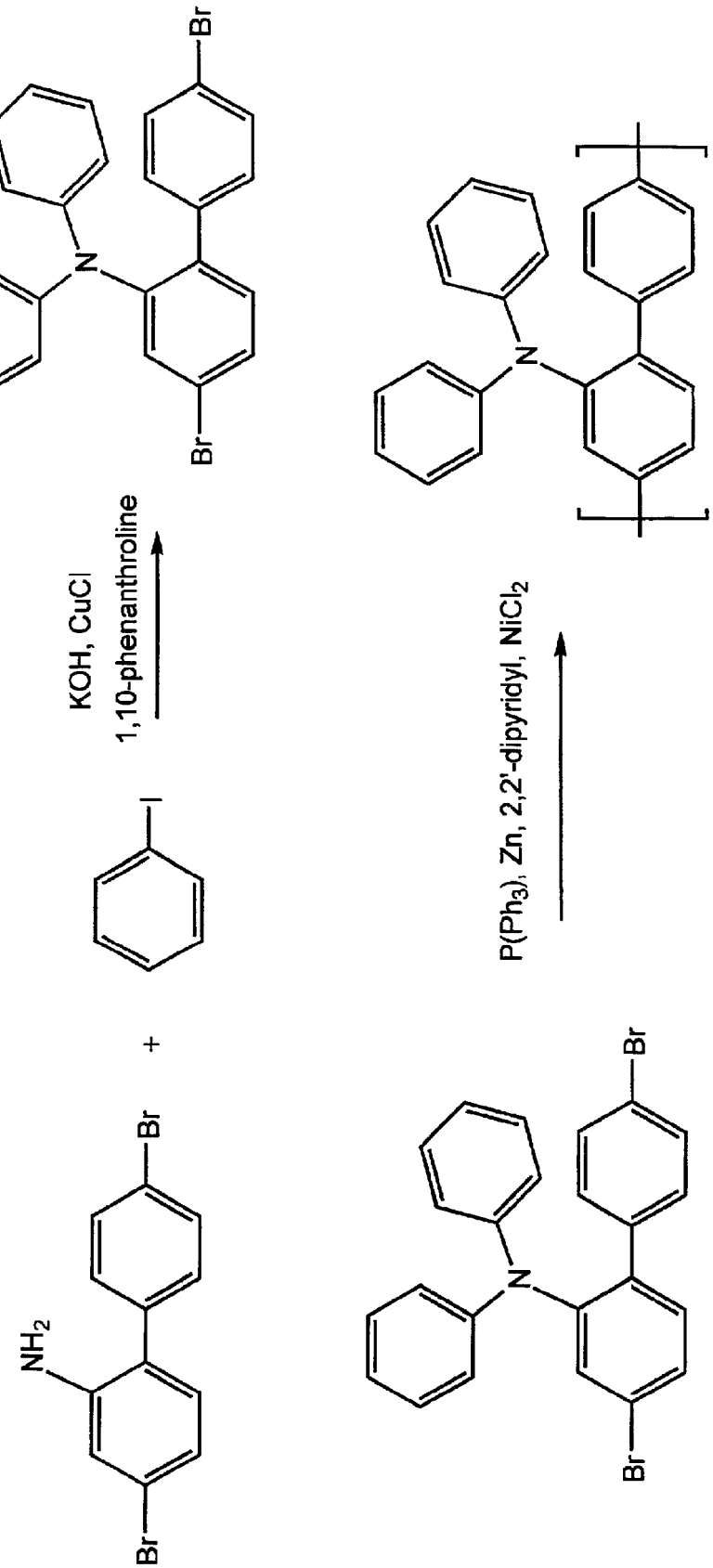
FIG. 1 schematically illustrates the preparation of the monomeric precursor 4,4'-dibromo-2-diphenylamino-1,1'-biphenyl as described in Example 1, followed by polymerization to give poly(2-diphenylamino-1,1'-biphenyl-4,4'-diyl, as described in Example 4.

Definitions and Nomenclature:

It is to be understood that unless otherwise indicated, this invention is not limited to specific starting materials, reagents or reaction conditions, as such may vary. It is also to be understood that the terminology used herein is for the purpose of describing particular embodiments only and is not intended to be limiting.

As used in this specification and the appended claims, the singular forms "a," "an" and "the" include plural referents unless the context clearly dictates otherwise. Thus, a reference to "a monomer unit" includes a single monomer unit as well as a combination of two or more monomer units that may be the same or different, reference to "a polymer" includes a combination or mixture of polymers as well as a single polymer, and the like.

As used herein, the phrase "having the structure" is not intended to be limiting and is used in the same way that the term "comprising" is commonly used. The term "independently selected from the group consisting of" is used herein to indicate that the recited elements, e.g., R groups or the like, can be identical or different.

The term "alkyl" as used herein refers to a branched or unbranched saturated hydrocarbon group typically although not necessarily containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 18 carbon atoms, preferably 1 to about 12 carbon atoms. The term "lower alkyl" intends an alkyl group of 1 to 6 carbon atoms. Preferred substituents identified as "$C_1$–$C_6$ alkyl" or "lower alkyl" contain 1 to 3 carbon atoms, and particularly preferred such substituents contain 1 or 2 carbon atoms (i.e., methyl and ethyl). "Substituted alkyl" refers to alkyl substituted with one or more substituent groups, and the terms "heteroatom-containing alkyl" and "heteroalkyl" refer to alkyl in which at least one carbon atom is replaced with a heteroatom, as described in further detail infra. If not otherwise indicated, the terms "alkyl" and "lower alkyl" include linear, branched, cyclic, unsubstituted, substituted, and/or heteroatom-containing alkyl or lower alkyl, respectively.

The term "alkenyl" as used herein refers to a linear, branched or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Generally, although again not necessarily, alkenyl groups herein contain 2 to about 18 carbon atoms, preferably 2 to 12 carbon atoms. The term "lower alkenyl" intends an alkenyl group of 2 to 6 carbon atoms, and the specific term "cycloalkenyl" intends a cyclic alkenyl group, preferably having 5 to 8 carbon atoms. The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl, respectively.

The term "alkylene" refers to a difunctional linear, branched or cyclic alkyl group, where "alkyl" is as defined above. Alkylene linkages thus include —$CH_2$—$CH_2$— and —$CH_2$—$CH_2$—$CH_2$—, as well as substituted versions thereof wherein one or more hydrogen atoms is replaced with a nonhydrogen substituent. "Heteroalkylene" linkages refer to an alkylene moiety wherein one or more methylene units is replaced with a heteroatom.

The term "alkenylene" as used herein refers to a difunctional branched or unbranched hydrocarbon group of 2 to 24 carbon atoms containing at least one double bond, such as ethenylene, n-propenylene, n-butenylene, n-hexenylene, and the like. The term "lower alkenylene" refers to an alkylene group of two to six carbon atoms, preferably two to four carbon atoms.

The term "alkoxy" as used herein intends an alkyl group bound through a single, terminal ether linkage; that is, an "alkoxy" group may be represented as —O—alkyl where alkyl is as defined above. A "lower alkoxy" group intends an alkoxy group containing 1 to 6 carbon atoms, and includes, for example, methoxy, ethoxy, n-propoxy, isopropoxy, t-butyloxy, etc. Preferred substituents identified as "$C_1$–$C_6$ alkoxy" or "lower alkoxy" herein contain 1 to 3 carbon atoms, and particularly preferred such substituents contain 1 or 2 carbon atoms (i.e., methoxy and ethoxy).

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 20 carbon atoms, and particularly preferred aryl groups contain 5 to 12 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituent, in which at least one carbon atom is replaced with a heteroatom, as will be described in further detail infra. If not otherwise indicated, the term "aryl" includes unsubstituted, substituted, and/or heteroatom-containing aromatic substituents.

The term "cyclic" refers to alicyclic or aromatic substituents that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

The terms "halo" and "halogen" are used in the conventional sense to refer to a chloro, bromo, fluoro or iodo substituent.

"Hydrocarbyl" refers to univalent hydrocarbyl radicals containing 1 to about 30 carbon atoms, preferably 1 to about 20 carbon atoms, most preferably 1 to about 12 carbon atoms, including linear, branched, cyclic, saturated and unsaturated species, such as alkyl groups, alkenyl groups, aryl groups, and the like. The term "lower hydrocarbyl" intends a hydrocarbyl group of 1 to 6 carbon atoms, and the term "hydrocarbylene" intends a divalent hydrocarbyl moiety containing 1 to about 30 carbon atoms, preferably 1 to about 20 carbon atoms, most preferably 1 to about 12 carbon atoms, including linear, branched, cyclic, saturated and unsaturated species. The term "lower hydrocarbylene" intends a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom, as explained in further detail below. Similarly, "substituted hydrocarbylene" refers to hydrocarbylene substituted with one or more substituent groups, and the terms "heteroatom-containing hydrocarbylene" and heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms are replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyalkyl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups such as halo, hydroxyl, sulfhydryl, alkoxy, alkenyloxy, alkynyloxy, aryloxy, acyl (including alkylcarbonyl (—CO-alkyl) and arylcarbonyl (—CO-aryl)), acyloxy (—O—(CO)—R, R=alkyl, aryl, allkaryl, etc.), alkoxycarbonyl (—(CO)—O-alkyl), aryloxycarbonyl (—(CO)—O-aryl), halocarbonyl (—CO)—X where X is halo), carboxy (—COOH), carboxylato (—COO$^-$), carbamoyl (—(CO)—NH$_2$), alkylcarbamoyl (—(CO)—NH-alkyl), arylcarbamoyl (—(CO)—NH-aryl), thiocarbamoyl (—(CS)—NH$_2$), carbamido (—NH—(CO)—NH$_2$), cyano(—C≡N), isocyano (—N$^+$≡C$^-$), cyanato (—O—C≡N), isocyanato (—O—N$^+$≡C$^-$), isothiocyanato (—S—C≡N), azido (—N=N$^+$=N$^-$), formyl (—(CO)—H), thioformyl (—(CS)—H), primary amino (—NH$_2$), mono- and di-(alkyl)-substituted amino, mono- and di-(aryl)-substituted amino, alkylamido (—NH—(CO)-alkyl), arylamido (—NH—(CO)-aryl), imino (—CR=NH where R=hydrogen, alkyl, aryl, alkaryl, etc.), alkylimino (—CR=N(alkyl), where R=hydrogen, alkyl, aryl, alkaryl, etc.), arylimino (—CR=N(aryl), where R=hydrogen, alkyl, aryl, alkaryl, etc.), nitro (—NO$_2$), nitroso (—NO), sulfo (—SO$_2$—OH), sulfonato (—SO$_2$—O$^-$), alkylsulfanyl (—S-alkyl; also termed "alkylthio"), arylsulfanyl (—S-aryl; also termed "arylthio"), alkylsulfinyl (—(SO)—O-alkyl), arylsulfinyl (—(SO)—O-aryl), boryl (—BH$_2$), borono (—B(OH)$_2$), phosphono (—P(O)(OH)$_2$), phosphonato (—P(O)(O$^-$)$_2$), phosphinato (—P(O)(O$^-$)), phospho (—PO$_2$), and phosphino (—PH$_2$); and the hydrocarbyl moieties C$_1$–C$_{24}$ alkyl (preferably C$_1$–C$_{18}$ alkyl, more preferably C$_1$–C$_{12}$ alkyl, most preferably C$_1$–C$_6$ alkyl), C$_2$–C$_{24}$ alkenyl (preferably C$_2$–C$_{18}$ alkenyl, more preferably C$_2$–C$_{12}$ alkenyl, most preferably C$_2$–C$_6$ alkenyl), C$_2$–C$_{24}$ alkynyl (preferably C$_2$–C$_{18}$ alkynyl, more preferably C$_2$–C$_{12}$ alkynyl, most preferably C$_2$–C$_6$ alkynyl), C$_5$–C$_{20}$ aryl (preferably C$_5$–C$_{12}$ aryl), and C$_5$–C$_{20}$ aralkyl (preferably C$_5$–C$_{12}$ aralkyl).

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

When the term "substituted" appears prior to a list of possible substituted groups, it is intended that the term apply to every member of that group. For example, the phrase "substituted alkyl and aryl" is to be interpreted as "substituted alkyl and aryl."

The term "polyether" as in a "polyether substituent" refers to an alkyl substituent containing two or more ether linkages. Such substituents include, by way of example, the moiety —(CH$_2$)$_x$(OCH$_2$CH$_2$)$_y$OR wherein x is zero, 1 or 2, y is generally 1 to 12, preferably 1 to 6, most preferable 1 to 3, and R is alkyl, preferably lower alkyl such as methyl or ethyl.

The term "conjugated" refers to a polymer having a π-electron conjugated system along the main chain (or "backbone"), and includes polymers that contain discrete conjugated segments as well as polymers that are completely conjugated.

The term "analog," as in an "analog" of poly (paraphenylene), refers to a poly(paraphenylene) in which one or more of the ring carbon atoms in the phenylene units are replaced with a nitrogen atom or substituted with a non-hydrogen substituent.

The Novel Polymers:

The polymers of the invention are comprised of monomer units having the general structure of formula (I):

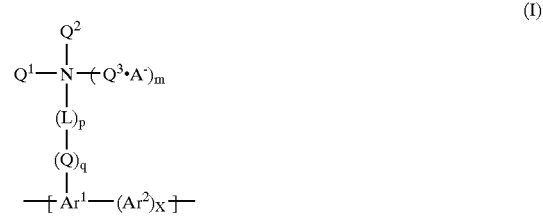

wherein:

Ar$^1$ and Ar$^2$ are independently selected from the group consisting of monocyclic, bicyclic and polycyclic arylene, heteroarylene, substituted arylene and substituted heteroarylene groups;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof;

Q is a heteroatom;

m is zero or 1;

p is zero or 1, and q is zero or 1, with the proviso that when p is zero, then q is zero;

x is zero or 1;

Q$^1$ and Q$^2$ are independently selected from the group consisting of H, aryl, heteroaryl, substituted aryl, substituted heteroaryl, alkyl, substituted alkyl, heteroalkyl, and substituted heteroalkyl, and Q$^3$ is selected from the group consisting of alkyl, substituted alkyl, heteroalkyl, and substituted heteroalkyl, with the proviso that when m is 1, Q$^1$ and Q$^2$ are other than H; and A$^-$ is a negatively charged counterion, e.g., a halide ion, an oxyanion (such as nitrate, sulfate, phosphate, carbonate, bromate, chlorate, or iodate) or the cyanide ion (NC$^-$).

Ar$^1$ and Ar$^2$ may be a five-membered or six-membered arylene, heteroarylene, substituted arylene or substituted heteroarylene group, or may contain one to five, typically one to three such groups, either fused or linked. Preferably, Ar$^1$ and Ar$^2$ are comprised of one or two aromatic rings. Ar$^1$ and Ar$^2$, and Q$^1$ and Q$^2$ (when other than H) and/or Q$^3$, may be substituted with one or more substituents that do not adversely affect the electroluminescent properties of the polymer, and that, ideally, enhance copolymer properties such as solubility and processability.

For polymers in which $Ar^1$, $Ar^2$, $Q^1$, $Q^2$ and/or $Q^3$ are substituted, examples of suitable substituents include:

—$(Q)_q$—$(L)_p$—$N(Q^1Q^2)$, wherein p, q, L, $Q^1$ and $Q^2$ are as defined above;

—$(Q)_q$—$(L)_p$—$N(Q^1Q^2Q^3)^+A^-$ wherein, p, q, L, $Q^1$, $Q^2$, $Q^3$ and $A^-$ are as defined above;

halo (with fluoro and chloro preferred);

cyano;

nitro;

sulfo (—$SO_3H$);

carboxyl (—COOH);

phosphono (—$O(PO)(OH)_2$);

sulfonato (—$SO_2$—O—);

carboxylato (—$COO^-$);

phosphonato (—$P(O)(O^-)_2$);

substituted and unsubstituted amino;

carbamoyl (—(CO)—NH);

$C_1$–$C_{20}$ hydrocarbyl including, but not limited to, $C_1$–$C_{20}$ alkyl, $C_2$–$C_{20}$ alkenyl and $C_5$–$C_{20}$ aryl;

substituted $C_1$–$C_{20}$ hydrocarbyl;

heteroatom-containing $C_1$–$C_{20}$ hydrocarbyl; and substituted heteroatom-containing $C_1$–$C_{20}$ hydrocarbyl.

In one embodiment, the polymer is functionalized so as to enable reaction with additional molecular species. For example, the polymer may be substituted with at least one functional group that enables intramolecular crosslinking, intermolecular crosslinking, or covalent attachment of additional polymeric segments that may or may not be conjugated. In addition, functional groups may be introduced that enable covalent attachment to a dopant such as an electroluminescent dye. The functional groups will generally be indirectly bound to the polymer, and will typically, although not necessarily, represent substituents on the $Ar^1$, $Ar^2$, $Q^1$, $Q^2$ and/or $Q^3$ moieties. Accordingly, in functionalized polymers of the invention, $Q^1$, $Q^2$, $Q^3$, $Ar^1$ and/or $Ar^2$ is substituted with a pendant group —Sp—Fn wherein Sp is a spacer, typically a $C_1$–$C_{20}$ alkylene or $C_2$–$C_{20}$ alkenylene linker that may contain one or more heteroatoms and/or substituents, and Fn is a functional group enabling reaction with an additional molecular moiety, e.g., a functional group that is capable of participating in a nucleophilic substitution reaction or another reaction that provides covalent attachment of the additional molecular moiety. Fn groups include, by way of example, hydroxyl, sulfhydryl, amino, carboxyl, halo, cyano, and carbamoyl groups, as well as olefinic species. Preferably Sp is $C_1$–$C_{20}$ alkylene and Fn is a terminal hydroxyl or carboxyl group, or a terminal vinyl group —CH=$CH_2$ allyl group —$CH_2$—CH=$CH_2$, or acrylate group —O—(CO)—CH=$CH_2$.

Examples of suitable $Ar^1$ and $Ar^2$ moieties include, but are not limited to, the following:

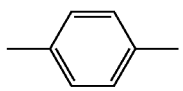

-continued

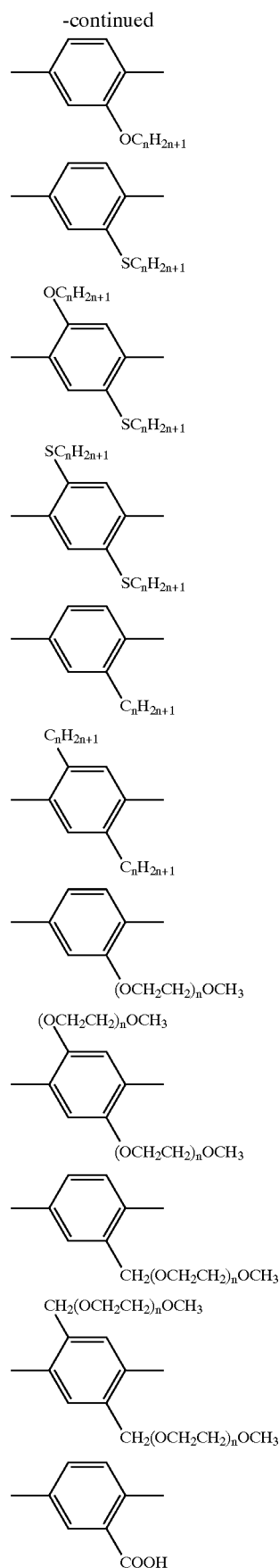

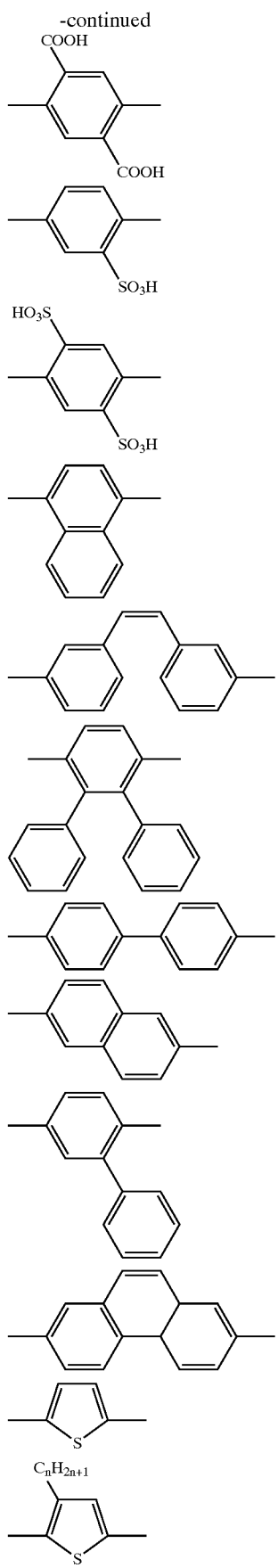
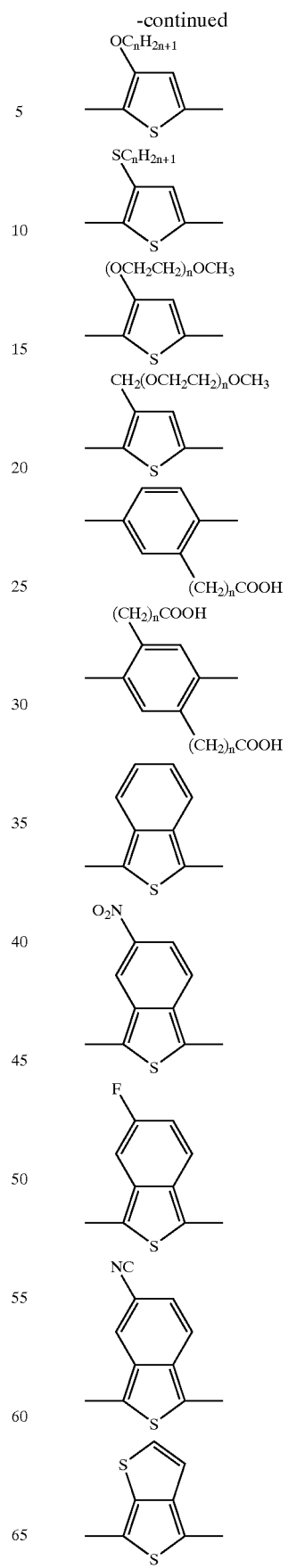

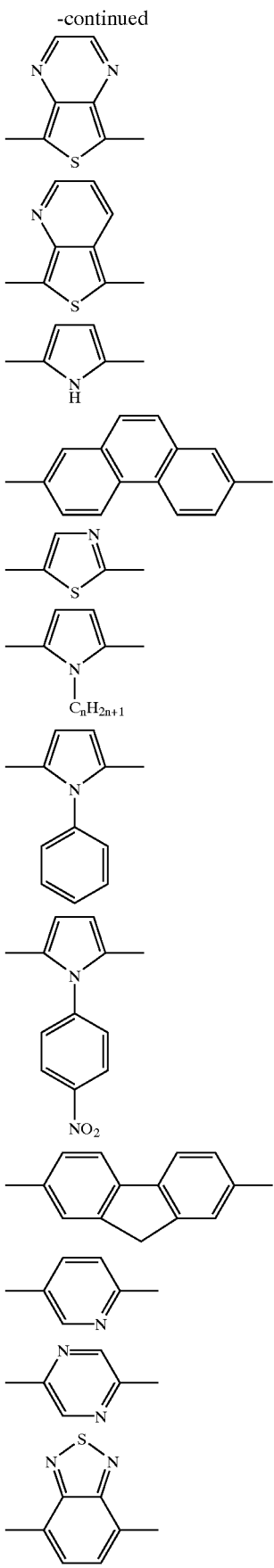

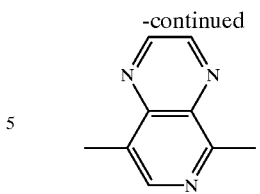

In the above structures, n is generally in the range of 1 to 12 inclusive.

Preferred polymers of formula (I) are comprised of monomeric units having the structure of formula (II):

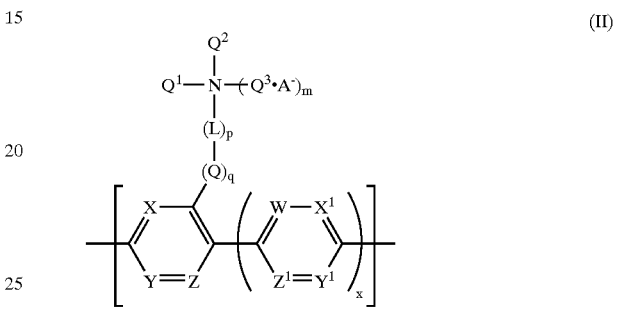

(II)

wherein:

L, Q, m, p, q, x, $Q^1$, $Q^2$, $Q^3$ and $A^-$ are as defined above; and

W, X, Y, Z, $X^1$, $y^1$, and $Z^1$ are independently selected from the group consisting of N, CH, and $CR^1$, wherein $R^1$ is selected from the group consisting of: $-(Q)_q-(L)_p-N(Q^1Q^2)$; $-(Q)_q-(L)_p-N(Q^1Q^2Q^3)^+A^-$; halo (with fluoro and chloro preferred); cyano; nitro; sulfo; carboxyl; phosphono; sulfonato; carboxylato; phosphonato; $C_1-C_{20}$ hydrocarbyl, including, but not limited to, $C_1-C_{20}$ alkyl, $C_2-C_{20}$ alkenyl and $C_5-C_{20}$ aryl; substituted $C_1-C_{20}$ hydrocarbyl, wherein the substituents may include, for example, halo (preferably fluoro or chloro), hydroxyl, sulfhydryl, amino, carboxyl, halo, cyano, sulfo, phosphono, sulfonato, carboxylato, phosphonato, and carbamoyl groups; heteroatom-containing $C_1-C_{20}$ hydrocarbyl including, but not limited to, $C_1-C_{20}$ alkoxy, alkylthio, arylthio, and polyether substituents; substituted heteroatom-containing $C_1-C_{20}$ hydrocarbyl such as $C_2-C_{20}$ alkoxycarbonyl, $C_6-C_{20}$ aryloxylcarbonyl, $C_2-C_{20}$ acyloxy, and halo-substituted polyether substituents; or wherein the Z and $Z^1$ moieties may be linked to form a cyclic group.

It will be appreciated that when W, X, Y, Z, $X^1$, $Y^1$, and $Z^1$ are all CH, and x is 1, the monomer unit shown represents a monomer unit of a poly(paraphenylene) polymer or copolymer. Further, when at least one of X, Y and Z (or W, $X^1$, $Y^1$, and $Z^1$) is N, the aromatic ring will be, for example, substituted or unsubstituted pyridinyl, pyridazinyl, pyrimidinyl, pyrazinyl, 1,2,4-triazinyl, or 1,2,3-triazinyl.

In preferred monomer units substituted with a $-(Q)_q-(L)_p-N(Q^1Q^2)$ or a $-(Q)_q-(L)_p-N(Q^1Q^2Q^3)^+A^-$ group, either: (a) x is 1 and $Z^1$ is $CR^1$ wherein $R^1$ is $-(Q)_q-(L)_p-N(Q^1Q^2)$ or $-(Q)_q-(L)_p-N(Q^1Q^2Q^3)^+A^-$; or (b) x is zero and Y is $CR^1$ wherein $R^1$ is $-(Q)_q-(L)_p-N(Q^1Q^2)$ or $-(Q)_q-(L)_p-N(Q^1Q^2Q^3)^+A^-$. Such monomer units have the structure of formula (III) or formula (IV), respectively:

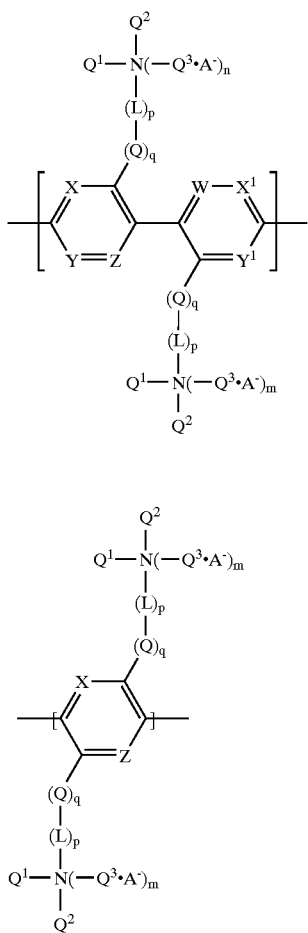

(III)

(IV)

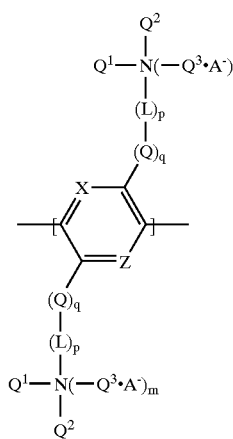

The polymer may also be functionalized as described with respect to formula (I). Here, preferred functionalized polymers, i.e., functionalized polymers comprised of monomer units having the structure of formula (II) are those wherein one or more of W, X, Y, Z, $X^1$, $Y^1$, $Z^1$, $Q^1$, $Q^2$, $Q^3$ has the structure —Sp—Fn, wherein Sp is a spacer moiety and Fn is a functional group, wherein examples of Sp and Fn groups are as described above.

Preferred L moieties are arylene, alkylene and alkenylene linkages, or comprise a combination thereof, e.g., an arylene moiety linked to an alkylene or alkenylene moiety. Particularly preferred L groups include phenylene and substituted phenylene.

When q is 1, such that the Q linkage is present, preferred moieties for Q are O and S, thus introducing an ether or thioether linkage between the arylene moiety of the polymer backbone and L. Q, if present, is most preferably O. Q may, however, be a nitrogen atom, in which case it will be in the form of an —NH— or —NR— linkage, wherein R is typically lower alkyl. In a particularly preferred embodiment, however, q is zero, such that Q is absent.

In a particularly preferred embodiment, m is zero, q is zero, x is 1, and L (if present), $Q^1$, and $Q^2$ are aromatic, such that the polymer is comprised of monomer units having the structure of formula (V):

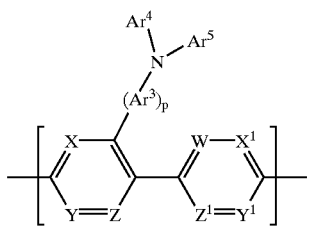

(V)

wherein the various substituents are as follows:

$Ar^1$ is arylene, heteroarylene, substituted arylene or substituted heteroarylene containing one to three aromatic rings. If present (i.e., when p is 1), $Ar^3$ is preferably phenylene.

$Ar^4$ and $Ar^5$ are independently selected from the group consisting of aryl, heteroaryl, substituted aryl and substituted heteroaryl containing one or two aromatic rings. $Ar^4$ and $Ar^5$ are preferably unsubstituted. If $Ar^4$ and/or $Ar^5$ are substituted, preferred substituents are $C_1$–$C_{12}$ alkyl, fluorinated (including perfluorinated) $C_1$–$C_{12}$ alkyl, $C_1$–$C_{12}$ alkoxy, fluoro, cyano, nitro, sulfonato, carboxylato, and phosphonato, and particularly preferred substituents are lower alkyl, fluorinated (including perfluorinated) lower alkyl, lower alkoxy, fluoro, cyano, nitro, and alkali metal (e.g., $Na^+$, $K^+$) sulfonato.

W, X, Y, Z, $X^1$, $Y^1$, and $Z^1$ are independently selected from the group consisting of N, CH, and $CR^1$, wherein $R^1$ is selected from the group consisting of: —$(Ar^3)_p$—$Ar^4Ar^5$ wherein $Ar^3$, p, $Ar^4$ and $Ar^5$ are as defined above; $C_1$–$C_{12}$ alkyl; fluorinated (including perfluorinated) $C_1$–$C_{12}$ alkyl; $C_1$–$C_{12}$ alkoxy; fluoro; cyano; nitro; sulfo; carboxyl; phosphono; sulfonato; carboxylato; and phosphonato; or —Z and $Z^1$ may be linked to form cyclic group so as to form a tricyclic compound having the structure (VI):

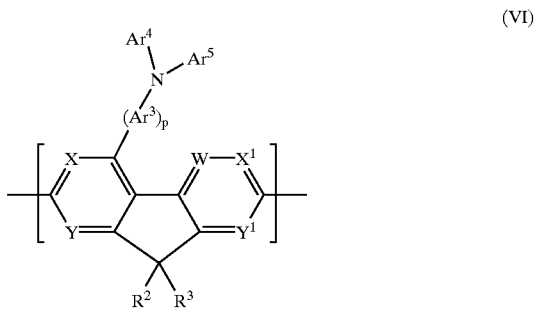

(VI)

in which $R^2$ and $R^3$ are independently selected from the group consisting of hydrogen, alkyl, substituted alkyl, heteroatom-containing alkyl, and substituted heteroatom-containing alkyl. $R^2$ and $R^3$ are preferably selected from the group consisting of: hydrogen; linear and branched $C_4$–$C_{12}$; cyano-substituted $C_4$–$C_{12}$ alkyl containing 1 or 2 cyano groups; and polyether substituents containing 2 to 5 ether oxygen atoms, with any two oxygen atoms separated by a $C_1$–$C_3$ alkylene linkage.

In this embodiment, the most preferred polymers are wherein n is zero, $Ar^4$ and $Ar^5$ are both phenyl optionally substituted with lower alkyl, lower alkoxy, fluoro, cyano, nitro, sulfonato and/or carboxylato groups, and the backbone aromatic moieties are either unsubstituted or substituted with an additional —N(Ar⁴Ar⁵) group. Polar groups such as sulfonato and carboxylato, as will be appreciated, increase the aqueous solubility of the polymer, and may therefore be preferred substituents for $Ar^4$ and $Ar^5$ as well as preferred $R^1$ moieties, when enhanced solubility is desired. An exemplary polymer of this type has the structure of formula (VII), wherein the R moieties may be the same or different and are selected from the group consisting of lower alkyl, lower alkoxy, fluoro, cyano, nitro, and/or sulfonate groups, and y and z are independently integers in the range of zero to 5, typically in the range of zero to 2.

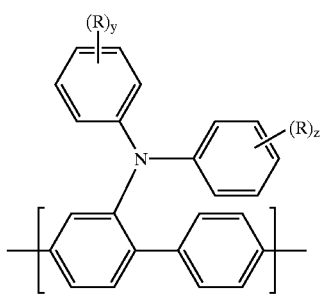

(VII)

Such polymers include those comprised of unsubstituted monomer units having the structure of formula (VIIa) as well as the di-substituted (i.e., di-methoxy) monomer units having the structure of formula (VIIb):

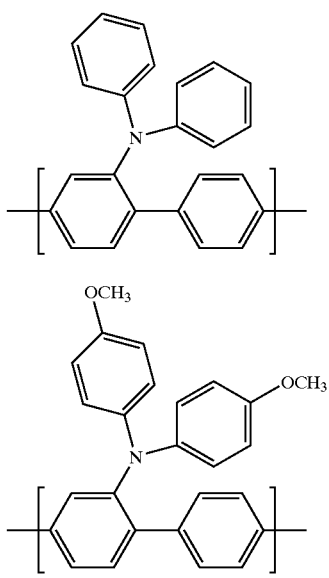

(VIIa)

(VIIb)

Copolymers:

In another embodiment of the invention, conjugated copolymers are provided, containing at least one first monomer unit $M^1$ and at least one second monomer unit $M^2$. The first monomer unit has the structure of formula (I), and, as such, includes monomer units having the structure (Ia) as well as monomer units having the structure (Ib):

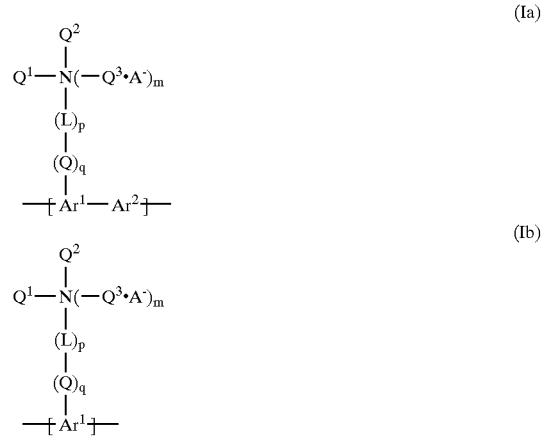

(Ia)

(Ib)

wherein m, p, q, $Ar^1$, $Ar^2$, $Q^1$, $Q^2$, $Q^3$, L, and $A^-$ are as defined earlier herein.

The second monomer unit $M^2$ is comprised of a vinylene unit or a monocyclic, bicyclic or polycyclic arylene, heteroarylene, substituted arylene or substituted heteroarylene unit, and may also be encompassed within formula (Ia) or (Ib). Bicyclic and polycyclic structures may be either fused or linked. The copolymer may be a random copolymer, but, more typically, will either be an alternating copolymer comprised of recurring —$M^1$—$M^2$— segments, or a block copolymer comprised of segments containing recurring $M^1$ units and other segments containing recurring $M^2$ units.

Preferably, copolymers of the invention contain at least one first monomer unit having the structure of formula (VIII), (IX), (X) and/or (XI):

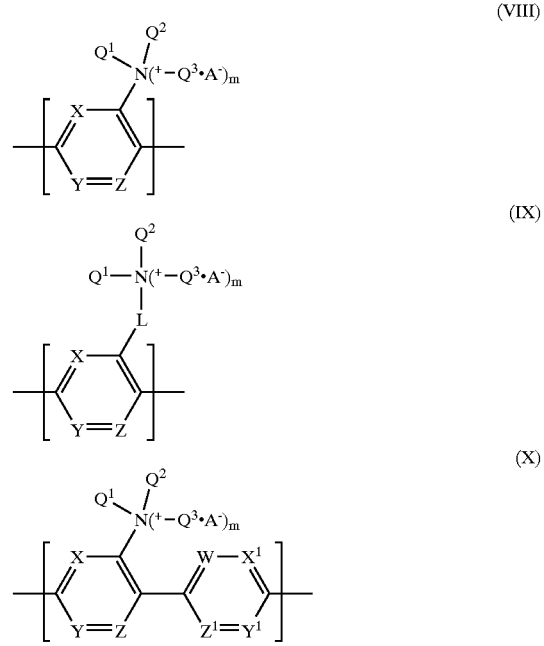

(VIII)

(IX)

(X)

-continued

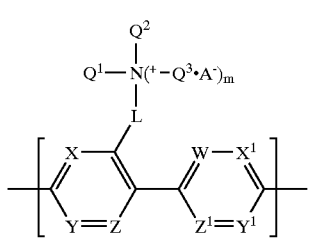
(XI)

wherein W, X, Y, Z, W, X¹, Y¹, Z¹, m, Q¹, Q², Q³, L, and A⁻ are as defined earlier herein.

In particularly preferred copolymers herein, m is zero, L is Ar³, Q¹ and Q² are Ar⁴ and Ar⁵. respectively, wherein Ar³, Ar⁴ and Ar⁵ are as defined earlier.

One example of a suitable second monomer unit $M^2$ is a fluorenyl moiety optionally 9,9-disubstituted with linear or branched alkyl substituents containing 4 to 10 carbon atoms, cyano-substituted alkyl substituents containing 1 or 2 cyano groups on a 4 to 10 carbon atom linear or branched alkyl group, or polyether substituents containing 2 to 5 ether oxygen atoms separated from one another by 1, 2 or 3 carbon alkylene bridges. Such monomer units have the structure (XII):

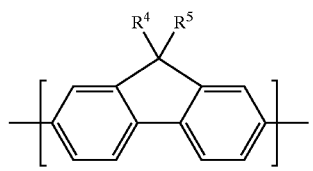
(XII)

wherein $R^4$ and $R^5$ are H or represent the aforementioned substituents at the 9-position. Accordingly, an exemplary copolymer containing this type of monomer unit has the structure of formula (XIII):

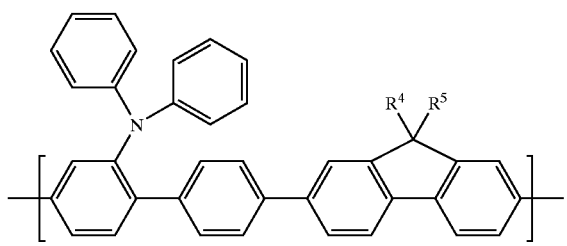
(XIII)

Another type of additional monomer unit is a phenylene vinylene monomer unit, either unsubstituted or substituted as described in co-pending U.S. patent application Ser. No. 09/619,372, filed Jul. 19, 2000, published through the PCT on Jan. 25, 2001 as WO 01/05863. Such monomer units will generally have the structure of formula (XIV):

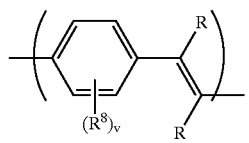
(XIV)

In formula (XIV), the substituents $R^6$ and $R^7$ are generally H but may also be halo (particularly chloro or fluoro) cyano, substituted or unsubstituted $C_1$–$C_{20}$, preferably $C_1$–$C_{12}$, alkyl or alkoxy, substituted or unsubstituted $C_2$–$C_{20}$, preferably $C_2$–$C_{12}$, alkenyl or alkynyl, and substituted or unsubstituted $C_5$–$C_{20}$, preferably $C_5$–$C_2$, aryl or heteroaryl. Alternatively, $R^6$ and $R^7$ may together form an additional bond, such that a triple bond connects the two carbon atoms shown. $R^8$ is halo, cyano, alkyl ($C_1$–$C_{20}$, preferably $C_1$–$C_{12}$), substituted alkyl ($C_1$–$C_{20}$, preferably $C_1$–$C_{12}$), heteroatom-containing alkyl (e.g., alkoxy, substituted alkoxy, or polyether; again, generally $C_1$–$C_{20}$, preferably $C_1$–$C_{12}$), aryl ($C_5$–$C_{20}$, preferably $C_5$–$C_{12}$) heteroaryl ($C_5$–$C_{20}$, preferably $C_5$–$C_{12}$), substituted aryl ($C_5$–$C_{20}$, preferably $C_5$–$C_{12}$), or substituted heteroaryl ($C_5$–$C_{20}$, preferably $C_5$–$C_{12}$), and v is an integer in the range of zero to 4 inclusive. When v is 2 or more two $R^8$ moieties on adjacent carbon atoms may be linked to form an additional cyclic group.

The additional monomer unit may also have the structure (XV):

(XV)

wherein w is zero or 1 and $M^3$ and $M^4$ are independently selected from the group consisting of: cyclopentadienyl; five-membered heterocycles containing one, two or three heteroatoms selected from S, O and N; and six-membered heterocycles containing one, two, three or four heteroatoms selected from S, O and N, wherein either $M^3$, $M^4$ or both are optionally substituted with one or two substituents selected from alkyl, alkoxy, nitro, sulfonic acid groups, and —(Ar³)ₙ—N(Ar⁴Ar⁵) moieties. Preferred additional monomer units of this type are wherein x is zero and $M^1$ and $M^2$ are thiophene, either unsubstituted or substituted with one to five —(Ar³)ₙ—N(Ar⁴Ar⁵), $C_{1-20}$ alkyl, or $C_{1-20}$ alkoxy substituents, typically with one or two —(Ar³)ₙ—N(Ar⁴Ar⁵), $C_{1-12}$ alkyl, or $C_{1-12}$ alkoxy substituents, and preferably with one or two $C_{1-12}$ alkyl or $C_{1-12}$ alkoxy substituents. Exemplary copolymers containing monomer unit (XV) have the structure (XVI):

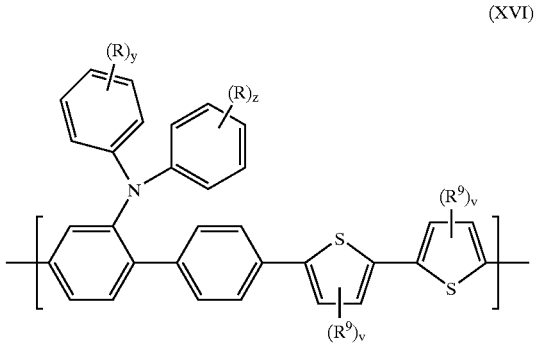
(XVI)

and related copolymers have the structure (XVII):

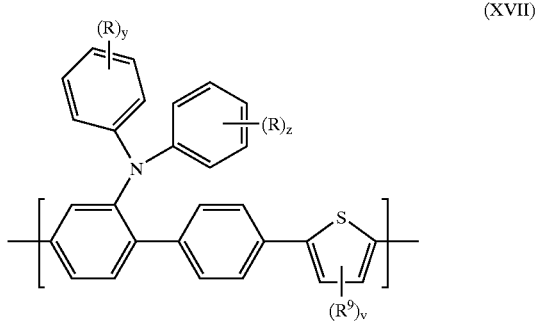

(XVII)

wherein y and z are independently integers in the range of zero to 5 inclusive, the R substituents may be the same or different and are selected from the group consisting of lower alkyl, lower alkoxy, fluoro, cyano, nitro, and sulfonate, v is zero, 1 or 2, preferably zero or 1, and $R^9$ is —$(Ar^3)_q$—N$(Ar^4Ar^5)$ (wherein $Ar^3$, q, $Ar^4$ and $Ar^5$ are as defined previously), $C_1$–$C_{20}$ alkyl or $C_1$–$C_{20}$ alkoxy, preferably —$(Ar^3)_q$—$Ar^4Ar^5$, $C_1$–$C_{12}$ alkyl or $C_1$–$C_{12}$ alkoxy, and most preferably $C_{1-12}$ alkyl or $C_1$–$C_{12}$ alkoxy. Additional related copolymers contain para-methoxy substituents on each phenyl ring of the diphenylamino substituent; such copolymers have the structure (XVIII):

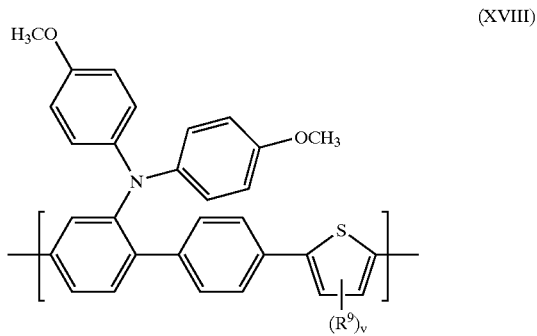

(XVIII)

Preferred additional monomer unit or units suitable for incorporation into copolymers of the invention as $M^2$ are comprised of a $C_5$–$C_{30}$, preferably $C_5$–$C_{20}$, mononuclear, binuclear, or polynuclear aromatic hydrocarbon, or a $C_5$–$C_{20}$, preferably $C_5$–$C_{12}$ mononuclear, binuclear, or polynuclear heteroaromatic group. In addition to the above, then, examples of other aromatic moieties suitable as the additional monomer unit(s) include, but are not limited to: the aromatic hydrocarbons naphthalene, acenaphthene, phenanthrene, anthracene, fluoranthene, pyrene, rubrene, and chrysene; heterocycles such as furan, thiophene, pyrrole, oxazole, isooxazole, thiazole, isothiazole, imidazole, oxadiazoles, thiadiazole, pyrazoles, pyridine, pyridazine, pyrimidine, pyrazine, triazines, and tetrazenes; benzo-fused ring systems such as benzoxazole, benzothiazole, benzimidazole, quinoline, isoquinoline, cinnoline, quinazoline, quinoxaline, phthalazine, benzothiadiazole, and benzotriazines; and polynuclear condensed ring systems such as phenazine, phenanthridine, acridine, carbazole, and diphenylene oxide. Like the first monomer unit, the additional monomer unit(s) are optionally substituted with one or more substituents that do not adversely affect the electroluminescent properties of the copolymer, and that, ideally, enhance copolymer properties such as solubility and processability. Examples of substituents include those moieties encompassed by the definition of $R^1$, as above.

As noted above, the copolymer may be a random copolymer, an alternating copolymer, or a block copolymer. With alternating copolymers, having the structure —$[M^1-M^2]$—, wherein $M^1$ and $M^2$ represent the first monomer unit and the second monomer unit, respectively, the molar ratio of the two monomer units is 50:50. With random copolymers and block copolymers, the molar ratio of the different monomer units in the copolymer is not critical; generally, however, the ratio of the first monomer unit to the second monomer unit will be in the range of about 20:80 to about 99:1.

The polymers of the invention exhibit a number of advantageous properties. In particular, the polymers:

display good semiconductivity, particularly hole mobility;

exhibit high photoluminescent and electroluminescent efficiency, in the range of 20–100%;

are quite soluble in organic solvents, presumably since the pendant amino groups tend to effect separation of the conjugated polymer chains from one another;

display good aqueous solubility when substituted with polar groups such as sulfonate and carboxylate groups;

form high quality thin films and fibers; and exhibit high thermal, chemical and photochemical stability.

Furthermore, those polymers comprising a poly(paraphenylene) backbone are blue light emitting, and display high photoluminescent and electroluminescent efficiency, i.e., in the range of 20–100%, as mentioned above. Minor modifications to the molecular structure of the blue-emitting polymers can be made so that light of a different wavelength is emitted, e.g., green rather than blue light.

Although the polymers are primarily useful as soluble, semiconductive polymers that emit blue light, it may be desirable to modify the polymers so as to shift the emission wavelength so that light of a different color is emitted as alluded to above. A wavelength shift may be readily achieved by introducing various side chains into the polymer and/or incorporating co-monomers that emit light in a different wavelength range. For example, as described in Example 8, poly(2-diphenylamino-1,1'-biphenyl-4,4'-diyl emits blue light, but when 4-methoxyphenyl is substituted for phenyl in the diphenylamino group, the polymer emits green light. As another example, polythiophenes substituted at the 3-position with a $C_6$–$C_{12}$ alkyl group may be incorporated into a copolymer so as to provide emission of red light. See, for example, Kraft (1998) Angew. Chem. Int. Ed. 37:402–428.

The polymers may, in some embodiments, be comprised of conjugated segments separated by nonconjugated linkages, e.g., linking groups such as methylene, ethylene, methoxy-ethylene, ethylene oxide, propylene oxide, and the like. Incorporating a high concentration of interruptions in an otherwise conjugated polymer chain can also shift the wavelength of emitted light. (With PPV, for example, it has been established that incorporation of substituted ethylene units in place of PPV's vinyl units can result shifting PPV's green emission into the blue-green range; see Kraft, supra.)

Other substituents, comonomers and linkages useful for effecting a wavelength shift and thereby changing the color of emitted light can be readily determined by one of skill in the art by reference to the pertinent texts and literature or by using routine experimentation.

Typically, the number average molecular weight of the polymers is in the range of approximately 1000 to 2,000,000, with preferred polymers having a number average molecular weight in the range of about 5000 to 1,000,000, and particularly preferred polymers having a number average molecular weight in the range of approximately 10,000 to 500,000. It will be appreciated that molecular weight can be varied to optimize polymer properties. For example, lower molecular weight is preferred to ensure solubility, while a higher molecular weight is generally necessary to provide for advantageous electrical and film-forming properties.

The invention additionally pertains to polymer blends containing one or more polymers of the invention as described above, and at least one additional polymer. For example, conductive blends may be prepared with at least one additional conjugated polymer, with the molar ratio of the polymers in the blend selected to maximize electroluminescence efficiency. Suitable additional conjugated polymers include, for example, cis and trans polyacetylenes, polydiacetylenes, polypyrroles, polythiophenes, polybithiophenes, polyisothianaphthene, polythienylvinylenes, polyphenylenesulfide, polyaniline, polyphenylenevinylenes, and polyphenylenevinylene derivatives, e.g., poly(2-methoxy-5-(2-ethylhexyloxy)-1,4-phenylene vinylene ("MEH-PPV") (see U.S. Pat. No. 5,189, 136 to Wudl et al.), poly (2,5-bischelostanoxy-1,4-phenylene vinylene) ("BCHA-PPV") (e.g., as described in International Patent Publication No. WO 98/27136), poly (2-N,N-dimethylamino phenylene vinylene) (described in U.S. Pat. No. 5,604,292 to Stenger-Smith et al.), and polythienylvinylenes.

Polymerization:

The polymers of the invention are generally synthesized by polymerizing monomers having the structure of formula (XIX):

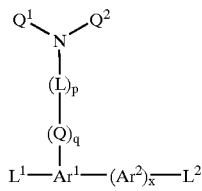

(XIX)

wherein:

$Ar^1$, $Ar^2$, L, p, q, x, Q, $Q^1$ and $Q^2$ are as defined previously, and $L^1$ and $L^2$ are selected from the group consisting of Br, I and Cl, thereby enabling reaction with other appropriately substituted monomers. The nitrogen atom indicated in the above structure may also be substituted with a fourth moiety, $Q^3$ (see structure (I) and accompanying substituent definitions) if a polymer substituted with a quaternary ammonium salt is desired rather than a polymer substituted with an uncharged amino group.

In preferred polymers, such monomers have the structure of formula (XX):

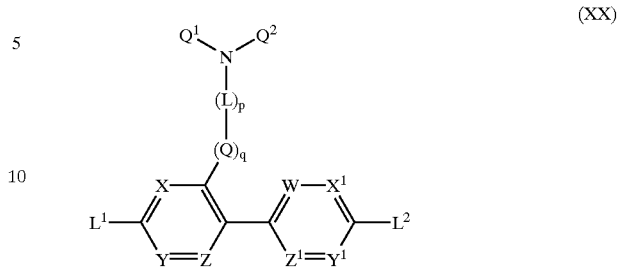

(XX)

wherein X, Y, Z, W, $X^1$, $Y^1$, $Z^1$, L, p, q, x, Q, $Q^1$ and $Q^2$ are as defined earlier.

By way of example, the polymers of the invention may be synthesized via the Yamamoto reductive coupling polymerization reaction from dihalo monomers. One specific example of such a reaction is as follows:

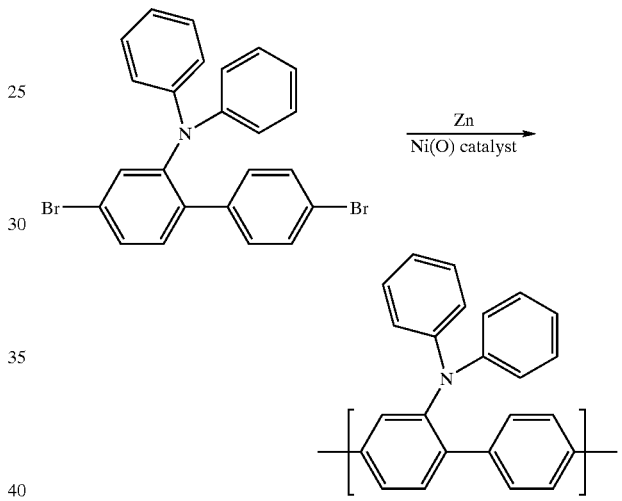

The Ni(0) catalyst can be generated from Zn and $NiCl_2$ in the presence of triphenylphosphine and, optionally, 2,2'-dipyridyl; see Example 4. Some commercially available Ni(0) catalysts may also be used, such as bis (triphenylphosphine) nickel chloride. Coupling reactions involving dihalo-functional reactants and nickel catalysts have been described, for example, by Colon et al. (1990) *Journal of Polymer Science, Part A, Polymer Chemistry Edition* 28:367 and Colon et al. (1986) *Journal of Organic Chemistry* 51:2627. The reaction is typically conducted in a polar aprotic solvent (e.g., dimethylacetamide) with a catalytic amount of nickel salt (e.g., $NiCl_2$, as indicated above), a substantial amount of triphenylphosphine and a large excess of zinc dust. A variant of this process is described by Ioyda et al. (1990) *Bulletin of the Chemical Society of Japan* 63:80, wherein an organo-soluble iodide was used as an accelerator. Another nickel-coupling reaction is disclosed by Yamamoto (1992) *Progress in Polymer Science* 17:1153 wherein a mixture of dihaloaromatic compounds were treated with an excess amount of nickel (1,5-cyclooctadiene) complex in an inert solvent. All nickel-coupling reactions when applied to reactant mixtures of two or more aromatic dihalides yield essentially random copolymers. Such polymerization reactions may be terminated by the addition of small amounts of water to the polymerization reaction mixture, which will replace the terminal halo substituents atoms with hydrogen atoms. Alternatively, a monofunctional aryl halide may be used as a chain terminator in such reactions, which will result in the formation of a terminal aryl group. By introducing appropriate end groups, stability and processability can be enhanced. Crosslinkable functional groups such as carboxylic acid groups and amino moieties may also be introduced into the polymer as end groups. Furthermore, by using an appropriately substituted starting material, e.g., a starting material substituted with a polar group such as a lower alkoxy, nitro or sulfonic acid substituent, the aqueous solubility of the polymeric product can be enhanced.

Monomers of formula (XIX) wherein Q is present can be readily synthesized according to the following scheme:

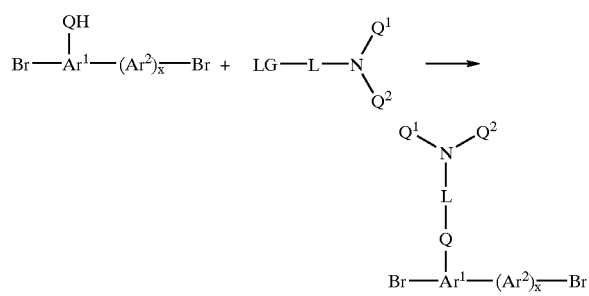

where LG is a leaving group capable of undergoing a nucleophilic addition reaction with the nucleophilic QH moiety, e.g., halo, preferably I, and Q is O or S, preferably O, and $Ar^1$, $Ar^2$, L, x, $Q^1$ and $Q^2$ are as defined previously. The resulting dihalo-monomers can be polymerized using the Suzuki coupling method shown below or by the Yamamoto coupling method illustrated above.

Copolymers of the invention may also be prepared using the Yamamoto reaction, wherein a dihalo-substituted (e.g., dibromo-substituted) first monomer is reacted with a dihalo-substituted second monomer. The first monomer may be any one of (VIII), (IX), (X) and (XI), and the second monomer will be a dihalo-substituted monomer corresponding to the second monomer units described in the preceding section.

Other processes may also be used to synthesize the polymers of the invention. One notable example is the Suzuki coupling polymerization process, as follows:

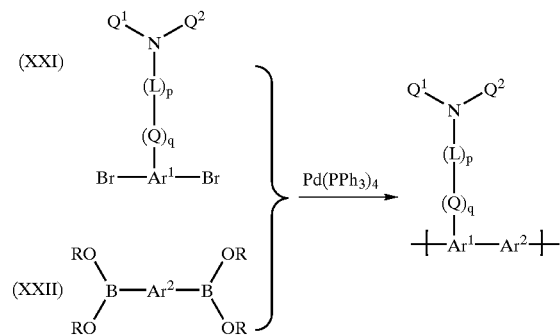

In the above scheme, $Ar^1$, $Ar^2$, L, n, $Q^1$ and $Q^2$ are as defined previously, and R is H or alkyl, or two R groups bound to the same boron atom may form a ring such as ethylenedioxy or 1,1,2,2-tetramethylethylenedioxy. Such a condensation reaction of an aromatic boronate and a bromide, commonly referred to as the "Suzuki reaction", is tolerant of the presence of a variety of organic functional groups, as reported by Miyaura and Suzuki in *Chemical Reviews* 95:2457–2483 (1995). This reaction can be applied to preparing high molecular weight polymers and copolymers. Procedurally, the substituted aromatic dibromide shown is reacted with an approximately equimolar amount of the diboronate under the catalytic action of Pd and triphenylphosphine. The reaction is typically conducted at about 70° C. to 120° C. in an aromatic hydrocarbon solvent such as toluene. Other solvents such as dimethylformamide and tetrahydrofuran can also be used, either alone or in mixtures with an aromatic hydrocarbon. An aqueous base, preferably sodium carbonate or bicarbonate, is used as the HBr scavenger. Depending on the reactivities of the reactants, the polymerization reaction may take 2 to 100 hours. Other variations of reaction conditions are given by Wallow and Novak (1994) *Journal of Organic Chemistry* 59:5034–5037 (1994), and by Remmers et al. (1996) *Macromolecular Rapid Communications* 17:239–252. An alternating copolymer results using the Suzuki reaction, although it is possible to control the sequencing of the monomeric units in the copolymer by controlling the order and composition of monomer feeds. If desired, a monofunctional aryl halide or aryl boronate may be used as a chain terminator in such reactions, which will result in the formation of terminal aryl groups.

It will be appreciated that the aforementioned reaction can also be used to prepare copolymers of the invention by starting with the monomer (XIX):

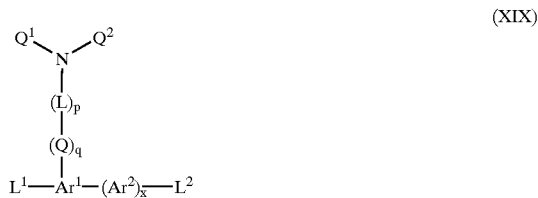

(XIX)

and polymerizing with the comonomer (XXIII):

(XXIII)

wherein R is as defined previously and $Ar^6$ represents the second monomer unit $M^2$ as defined herein. For example, the compounds shown below are used as monomeric reactants in a preferred method of synthesizing poly(2-diphenylamino-1,4-phenylene). This method is useful for synthesizing polymers having a higher molecular weight than polymers synthesized using Suzuki coupling or the Yamamato reduction described above.

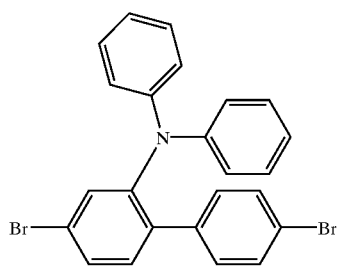

-continued

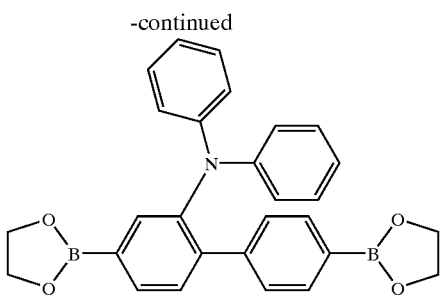

As will be appreciated by those working in the field of conjugated polymers, the conjugated electroluminescent polymers of the invention may be prepared by a host of other techniques not specifically described above. See, for example, *Handbook of Conducting Polymers*, $2^{nd}$ Ed., Skotheim et al., Eds. (New York: Marcel Dekker, Inc., 1998), particularly Chapter 13, and references cited therein.

Utility:

In general, the polymers of the invention are useful in any application wherein a conjugated polymer, particularly a conjugated electroluminescent polymer, would have utility. For example, the present polymers are suitable as the active material in the following devices: thin film semiconductor devices such as light emitting diodes and displays, laser diodes, transistors, photodetectors, photoconductors, and solar cells; electrochemical devices such as rechargeable batteries, capacitors, supercapacitors, electrochromic devices, electrode-modifying materials, light emitting electrochemical cells (both in thin film and in solution), and sensors; and in optoelectronic devices such as photorefractive devices, optical switches, and optical data storage devices. Furthermore, upon being rendered conductive by doping or admixture with an ionizable species (e.g., using ion implantation), the polymers of the invention will find additional utility in those contexts wherein a conductive polymer would be useful.

Semiconductive compositions may be prepared that comprise a polymer of the invention optionally combined with an admixer, typically a compound selected such that charge and/or energy transfer takes place between the admixer and the polymer when a voltage is applied across the composition. For example, the admixer may be a second conjugated polymer, either a poly(paraphenylene) polymer, copolymer or analog as provided herein, or another type of conjugated polymer, typically selected from cis and trans polyacetylenes, polydiacetylenes, polypyrroles, polythiophenes, polybithiophenes, polyisothianaphthene, polythienylvinylenes, polyphenylenesulfide, polyaniline, polyphenylenevinylenes, and polyphenylenevinylene derivatives, for example, MEH-PPV, BCHA-PPV, poly(2-N,N-dimethylamino phenylene vinylene) and polythienylvinylenes. The admixer may also be a fullerene such as: $C_{60}$ itself ("Buckminsterfullerene"), having icosahedral symmetry and consisting of 12 five-membered rings and 20 six-membered rings; a higher order fullerene such as the ellipsoidally shaped $C_{70}$ and $C_{84}$, the icosahedrally shaped $C_{80}$ or $C_{140}$, or the giant, spherically shaped $C_{256}$; a hyperfullerene (or fullerene "onion") comprised of a concentric carbon cage that preferably contains $C_{60}$ (e.g., $C_{60}@C_{180}$, $C_{60}@C_{240}$, $C_{60}@C_{540}$, $C_{60}@C_{240}@C_{540}$); fullerone nanotubes; and fullerene capsules. Such semiconductive compositions may also advantageously contain one or more additional components, such as color modifiers, stability enhancers, crosslinking agents, ionizable species, luminescent dyes that serve as dopants, and the like.

A preferred admixer incorporated into semiconductive compositions containing a polymer of the invention is a luminescent dye that serves as a dopant, insofar as the present polymers are particularly suitable as a host for luminescent dyes to achieve electroluminescence. Luminescent dyes suitable for use herein include both phosphorescent dyes and fluorescent dyes. As is understood in the art, luminescent compounds absorb radiative energy (e.g., x-rays, ultraviolet radiation, or visible light), and then emit light at a lower energy. Those compounds whose emission is prolonged, i.e., continues for a time period in the range of tens of microseconds to several minutes after excitation is discontinued, are called "phosphors," while those that emit light within a microsecond are termed "fluorescent." The preferred luminescent dyes herein are phosphorescent.

Phosphorescent dyes suitable as dopants in the present compositions include, but are not limited to, organometallic complexes such as those described in U.S. Pat. No. 6,039,894 to Sanjurjo et al., assigned to SRI International (Menlo Park, Calif.). Those organometallic complexes are formed by treatment of selected phosphor precursors with a reactive gas, wherein the precursors are generally comprised of a salt of a lanthanide element, an actinide element, yttrium, or a combination thereof, and the reactive gases may be, for example, oxygen-containing (so as to form oxide phosphors), sulfur-containing (so as to form sulfide phosphors), or chlorine-containing (so as to form chloride phosphors). Preferred such phosphors contain yttrium (Y), ytterbium (Yb) or erbium (Er).

Other phosphorescent complexes suitable for use herein are phosphorescent metal complexes, such as transition or lanthanide metals. Preferred complexes comprise iridium, osmium, platinum, tungsten, and gold, most preferably iridium, osmium or platinum complexes, wherein the ligands generally coordinate through at least one nitrogen atom present in an N-heteroaryl group. Such ligands include bidentate ligands such as 2-phenylpyridine (ppy), 2,2'-bipyridine, 4-phenylpyrimidine, 2-thienylpyridine, benzoquinoline, acetylacetonate, 2-phenylbenzothiazole, as well as tetradentate ligands such as the porphyrins, including tetrabenzoporphyrin (TBP), tetranaphthaloporphyrin (TNP), and tetraphenyltetrabenzoporphyrin (TPTBP). Preferred porphyrins are octa-alkyl substituted porphines, with platinum octaethylporphine (i.e., 2,3,7,8,12,13,17,18-octaethyl-21H,23H-porphine) particularly preferred.

Generally, selection of a particular luminescent dopant will depend, in part, on the color of the dopant's emitted light, since one feature of a dopant is the capability of altering the color of light emitted by an electroluminescent polymer. Preferred luminescent dopants herein are dyes that absorb the light emitted by the electroluminescent polymer and emit light at a different wavelength. In some instances, excitons formed in the host polymer transfer to the dopants, effecting a down-converting color change. Accordingly, these preferred luminescent dopants absorb light in the visible wavelength range of 400 nm to 700 nm, including blue light (430 nm to 500 nm), green light (500 nm to 560 nm), and red light (620 nm to 700 nm), and emit light of a different color. Other luminescent dopants absorb ultraviolet light, but nevertheless emit visible light.

Dopants that result in this down-converting color change include, for example, beta-diketonate complexes with Europium, which emit red light, in particular, tris (acetylacetonato)(monophenanthroline) europium. The choice of ligand for the complex with Europium is not limited to diketonate complexes. In general, any ligand will be suitable if the triplet level of the ligand is higher in energy than the emissive level ($^5D_0$) of $Eu^{3+}$, and if the ligand absorbs in the emission spectrum of the inventive polymers described herein. Further description of these dopants can be found in McGehee et al., Adv. Mater. (1999) Vol. 11(16), pp. 1349–1354. Additional examples of red dyes include divalent metal maleonitriledithiolate complexes, such as those described by C. E. Johnson et al. in "Luminescent Iridium (I), Rhodium(I), and Platinum(II) Dithiolate Complexes," Journal of the American Chemical Society (1983) Vol. 105, p. 1795. For example, the maleonitriledithiolate complex with platinum (Pt(Pph$_3$)) has a characteristic wavelength emission of 652 nm.

The luminescent dopant is not, however, necessarily a metal-containing compound. Many fluorescent dyes are organic, and, while few organic phosphors are known, several phosphorescent materials have been disclosed that are non-metallic, one example of which is decacyclene. Other nonmetallic luminescent dopants include, by way of example, diphenylanthracene, dibenzanthracene, pentacene, dibenzpentacene, bis(phenylethynyl)anthracene, naphthacenes and substituted naphthacenes such as bis(phenylethynyl)naphthacene, pentaphenyl cyclopentadiene, tetraphenyl cyclopentadiene, rubrene, and the like. Fluorescent compounds, such as laser dyes or conjugated polymers, are useful dopants with the polymers of the invention and can be used to select desired emission spectral characteristics. These compounds absorb the light emitted by the host polymer and re-emit their own characteristic fluorescent spectrum. (Nishio, H. et al., Synthetic Metals (1995) Vol. 68, pp. 243–247.) For example, green fluorescent dyes such as polymethine dyes including cyanines, merocyanines, complex cyanines and merocyanines, oxonols, hemioxonols, styrls, merostyryls, streptocyanines and coumarins can be used with the present polymers to achieve a green emission. Coumarin-6 is a preferred dye that can be used with the present polymers to achieve a green emission. Examples of red fluorescent dyes are 4-dicyano-methylene-4H-pyrans and 4-dicyanomethylene-4H-thiopyrans.

The luminescent dopant may be incorporated into a composition of the invention using any suitable technique that allows the dopant to infiltrate the polymer matrix. For example, the dopant may be incorporated into a solid polymer matrix of the invention using vacuum deposition, or may be dissolved along with the conjugated polymer during polymer synthesis and/or during manufacture of an electroluminescent device. It is also possible to covalently attach the luminescent dopant to the polymer backbone or to a pendant group on the polymer, by reaction of a suitable luminescent compound with a functional group Fn on the polymer. If the selected luminescent compound does not contain a suitable reactive site, the compound may be modified prior to covalent attachment to the polymer. For example, if the functional group Fn is a nucleophilic group such as a hydroxyl or amino group, the luminescent compound should contain a hydroxyl-reactive or amino-reactive site, respectively. Suitable hydroxyl-reactive and amino-reactive sites include electrophilic moieties that facilitate a nucleophilic substitution reaction to form covalent bonds.

Conductive compositions may be prepared by doping the polymers of the invention for conversion thereof to a conductive state. The term "doping" is used herein in its conventional sense to refer to the addition or withdrawal of electrons to a conjugated polymer so that positive or negative charge is introduced therein. Doping is thus essentially a redox reaction that involves electron transfer between a conjugated polymer and a dopant. Doping may be carried out electrochemically, by chemical treatment with a dopant (e.g., an oxidant dopant such as AsF$_5$, FeCl$_3$, iodine, H$_2$SO$_4$, SO$_3$, HClO$_4$, CF$_3$COOH, H$_2$O$_2$, etc.) or by other means, as will be appreciated by those skilled in the art. See, e.g., T. A. Skotheim et al., "*Electroresponsive Molecular and Polymeric Systems*," (New York: Marcel Dekker, 1991). Doping will generally be reversible, such that the conductive polymer can return to its original semiconductive state, or in some cases it may be permanent.

The polymers of the invention are particularly useful as electroluminescent materials (i.e., as materials that can generate light upon electrical excitation) in electroluminescence devices such as LEDs, photodetector devices, light-emitting electrochemical cells, and the like. Electroluminescence devices, including LEDs, are generally comprised of laminates of a suitable electroluminescent material disposed between a hole-injecting electrode layer and an electron-injecting electrode layer. Additional layers, elements, and/or a substrate may or may not be present. In a photodetector device, for example, a means for detecting a photocurrent (i.e., a light-induced electrical current) flowing between the electrodes will be included. Another use of the present polymers is in a photovoltaic device used for the generation of electrical power. Such devices generally comprise a first electrode, a semiconductive layer provided on the first electrode, and a second electrode (sometimes termed a "collector electrode") provided on the light incidence surface of the semiconductive layer; a polymer of the invention may be advantageously used as the aforementioned semiconductive layer. Electrochemical sensors may also be fabricated using the present polymers; such sensors are generally comprised of a counter electrode, a reference electrode, a working electrode, an optional reference electrode, and a means for applying an electrical potential between the working and counter electrodes, wherein a polymer of the invention is applied to the surface of the working electrode. The polymers are also useful in the fabrication of transistors, particularly field effect transistors. FETs, as is well known in the art, are comprised of a gate electrode, a source electrode, a drain electrode, and a semiconductive channel, e.g., comprising a polymer of the invention, electrically connecting the source electrode and the drain electrode.

A particularly preferred application of the present polymers is in the fabrication of an cavity-emission electroluminescent device as described in commonly assigned, co-pending U.S. patent application Ser. No. 09/618,864, entitled "Cavity-Emission Electroluminescent Device and Method for Forming the Device" (Pei et al.), filed Jul. 19, 2000. The cavity-emission electroluminescent device is comprised of a layered structure having a hole-injection electrode layer for injecting holes into an electroluminescent material, an electron-injection electrode layer for injecting electrons into an electroluminescent material and a dielectric layer interposed between the hole-injecting and electron-injecting electrode layers. A cavity is formed extending through at least the dielectric layer and one of the electrode layers and has an interior cavity surface comprising a hole-injection electrode region, an electron-injection electrode region and a dielectric region. Once the cavity is formed, the interior cavity surface is coated with an electroluminescent coating material of the invention such that the electroluminescent material electrically contacts the hole-injection and electron-injection electrode regions of the surface. Optionally, a plurality of cavities in an array may be formed in a layered structure to form an electroluminescent display device.

It is to be understood that while the invention has been described in conjunction with the preferred specific embodiments thereof that the foregoing description as well as the examples that follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

EXPERIMENTAL

The practice of the present invention will employ, unless otherwise indicated, conventional techniques of polymer chemistry, and the like, which are within the skill of the art.

Such techniques are explained fully in the pertinent texts and literature. See, e.g., *Vogel's Textbook of Practical Organic Chemistry*, 5th Ed., B. S. Furniss et al., eds. (New York: Longman Scientific and Technical, 1989); A. Kraft et al. (1998) *Angew. Chem. Int. Ed.* 37:402–428; and T. A. Skotheim et al., "*Electroresponsive Molecular and Polymeric Systems*," (New York: Marcel Dekker, 1991), cited supra.

In the following examples, efforts have been made to ensure accuracy with respect to numbers used (e.g., amounts, temperature, etc.) but some experimental error and deviation should be accounted for. Unless indicated otherwise, temperature is in degrees C. and pressure is at or near atmospheric. All solvents were purchased as HPLC grade, and all reactions were routinely conducted under an inert atmosphere of nitrogen unless otherwise indicated. All reagents were obtained commercially unless otherwise indicated.

Example 1

SYNTHESIS OF 4,4'-DIBROMO-2-DIPHENYLAMINO-1,1'-BIPHENYL 4,4'-Dibromo-2-amino-1,1'-biphenyl (16.35 g, prepared according to Libman and Slack (1951) *J. Chem. Soc., p.* 2588), iodobenzene (26.52 g, 0.13 mol), flake potassium hydroxide (22.4 g, 0.35 mol), 1,10-phenanthroline (0.45 g), copper (I) chloride (0.25 g), and toluene (30 ml) were charged into a flask and stirred at reflux for 15 hours. The dark reaction mixture was cooled to room temperature and diluted with 200 ml of toluene. The toluene solution was washed with DI water, dried with magnesium sulfate, and evaporated. The dark residue obtained was recrystallized trice from hexane/toluene (4:1 in volume) to yield 10 grams of white crystals to yield the desired monomer. $^1$H NMR (CDCl$_3$): δ=6.8–7.5, multiple peaks.

Example 2

SYNTHESIS OF 4,4'-DIBROMO-2-BIS(4-METHOXYPHENYL)AMINO-1,1'-BIPHENYL 4,4'-Dibromo-2-amino-1,1'-biphenyl (16.35 g, 0.05 mol), 4-iodoanisole (28 g, 0.12 mol), potassium carbonate (–325 mesh fine powder, 16.6 g, 0.12 mole), copper dust (–150 mesh, 1.0 g), and nitrobenzene (20 ml) were charged into a flask and stirred at gentle reflux for 15 hours. The dark reaction mixture was cooled to room temperature and extracted with 200 ml of toluene. The toluene solution was evaporated. The dark residue obtained was then mixed with 10 ml of toluene and chromatographed on a silica gel column using hexane and hexane/ethyl acetate (20:1) eluant. The portions containing the product were collected and evaporated. The residue was recrystallized twice from hexane/toluene (300 ml/60 ml) to yield 7.4 grams of off-white crystals of the desired monomer. $^1$H NMR (CDCl$_3$): δ=6.8–7.5 (15 H, multiple peaks); 3.78 (6 H).

Example 3

SYNTHESIS OF 4,4'-DIBROMO-2-DIOCTYLAMINO-1,1'-BIPHENYL

The reaction of Example 1 was repeated, except that 1-bromooctane (25.09 g, 0.13 mole) was used in place of iodobenzene. The product was purified by column chromatography on silica gel using hexanes as eluant.

Example 4

PREPARATION OF POLY(2-DIPHENYLAMINO-1,1'-BIPHENYL-4,4'-DIYL 4,4'-Dibromo-2-diphenylamino-1,1'-biphenyl (2.87 g, prepared in Example 1), triphenylphosphine (1.57 g), zinc powders (1.17 g), 2,2'-dipyridyl (0.047 g), and Ni(II) chloride (0.039 g) were placed in a 100 ml round-bottom flask, and purged with pure nitrogen. Then, 1-methyl-2-pyrrolidinone (30 ml) was added via syringe, and the mixture was stirred under nitrogen at 75° C. for 60 hours. The temperature was raised to 85° C., and one drop of 1-bromo-4-t-butylbenzene was added. The mixture was further stirred at 85° C. for 5 hours and then cooled to room temperature. Methanol (50 ml) was added. The precipitate was collected by centrifugation and washed repeatedly with methanol. It was redissolved in 50 ml chloroform. The chloroform solution was centrifuged to remove insoluble particles. Into the clear solution, 100 ml methanol was added. The polymer precipitate was collected by centrifugation. The polymer was dried in vacuum to yield 1.5 gram of off-white solid.

Example 5

PREPARATION OF POLY[(2-DIPHENYLAMINO-1,1'-BIPHENYL-4,4'-DIYL)-CO-(2-DIOCTYLAMINO-1,1'-BIPHENYL-4,4'-DIYL)]

The procedure of Example 4 was followed, except that 0.33 g of 4,4'-dibromo-2-dioctylamino-1,1'-biphenyl was used in addition to 4,4'-dibromo-2-diphenylamino-1,1'-biphenyl.

Example 6

PREPARATION OF POLY[(2-DIPHENYLAMINO-1,4-PHENYLENE)

1,4-Dibromo-2-diphenylaminobenzene (2.01 g) (prepared from 2,5-dibromoaniline and iodobenzene using the method of Example 2), triphenylphosphine (1.6 g), zinc powders (1.2 g), 2,2'-dipyridyl (0.05 g), and Ni(II) chloride (0.04 g) were placed in a 100 ml round-bottom flask, and purged with pure nitrogen. Then N,N-dimethylformamide (25 ml) was added via syringe, and the mixture was stirred under nitrogen protection at 80° C. for 48 hours. Methanol (40 ml) was added. The precipitate was collected by centrifugation, washed repeatedly with methanol, and then redissolved in 50 ml tetrahydrofuran. The THF solution was centrifuged to remove insoluble particles (mostly unreacted zinc). Into the clear solution, 5 ml of 10% HCl solution was added. DI water (50 ml) was then added, and the polymer precipitate was collected by centrifugation. The polymer was further purified in THF/methanol, and dried in vacuum to yield 0.65 gram of white solid.

Example 7

SYNTHESIS OF POLY(2-BIS [4-METHOXYPHENYL]AMINO-1,1'-BIPHENYL-4, 41-DIYL)

4,4'-Dibromo-2-bis(4-methoxyphenyl)amino-1,1'-biphenyl (5.4 g, prepared in Example 2) triphenylphosphine (1.3 g), zinc powders (1.96 g), 2,2'-dipyridyl (0.078 g), and Ni(II) chloride (0.065 g) were placed in a 100 ml round-bottom flask, and purged with pure nitrogen. Then, 1-methyl-2-pyrrolidinone (30 ml) was added via syringe, and the mixture was stirred under nitrogen protection at 75° C. for 15 hours when the solution became very viscous. More 1-methyl-2-pyrrolidinone (20 ml) was added. The temperature was raised to 85° C. After 20 hours, 1 drop of 1-bromo-4-t-butylbenzene was added. The mixture was further stirred at 85° C. for 5 hours and cooled to room temperature. The polymer was purified by repeated precipitation and dissolution in methanol and chloroform to yield 2.4 g of a bright yellow solid. $^1$H NMR (CDCl$_3$): δ=6.55–7.5

(multiple peaks), 3.7 (single peak), 1.6 (single peak). The relative ratio of H content indicates an average polymer chain containing 18 2-bis[4-methoxyphenyl]amino-1,1'-biphenyl-4,4'-diyl monomer units end-capped with 4-tert-butylphenyl groups. This corresponds to a number average molecular weight of approximately 7100.

Example 8

PROCESSABILITY AND FLUORESCENCE

The polymers prepared in Examples 4, 5, 6 and 7 were admixed with various organic solvents, including water, chlorinated solvents such as chloroform and chlorobenzene, and other organic solvents such as methanol and n-butyl acetate. Each of the polymers were found to have good solubility in the chlorinated solvents, but were relatively insoluble in methanol, n-butyl acetate and water. High quality thin films were formed after the polymer solutions were cast on glass slides and solvents evaporated. The films of poly(2-diphenylamino-1,1'-biphenyl-4,4'-diyl) appeared colorless, and fluoresced brilliant blue light with a photoluminescent quantum efficiency of greater than 50%. Films of poly(2-bis[4-methoxyphenyl]amino-1,1'-biphenyl-4,4'-diyl) appeared light yellow and fluoresced brilliant green light, also with a photoluminescent quantum efficiency greater than 50%.

Example 9

STABILITY EVALUATION

Thin films of poly(2-diphenylamino-1,1'-biphenyl-4,4'-diyl) and poly(2-bis[4-methoxyphenyl]amino-1,1'-biphenyl-4,4'-diyl) as prepared in the Examples 4 and 7, respectively, were found to be very stable in air even at elevated temperatures. After being heated on a hot plate at 130° C. for 5 hours, there was no observable change in absorption color or fluorescent color, nor was any degradation in photoluminescent quantum efficiency was observed. Additional stability testing was conducted with poly(2-diphenylamino-1,1'-biphenyl-4,4'-diyl), and after heating at 170° C. for 5 hours, there was no observable change in optical absorption or fluorescent color, nor was any degradation in photoluminescent quantum efficiency observed.

Example 10

CURRENT-LIGHT-VOLTAGE RESPONSE OF A DOPED POLYMER LED

Figure 2:
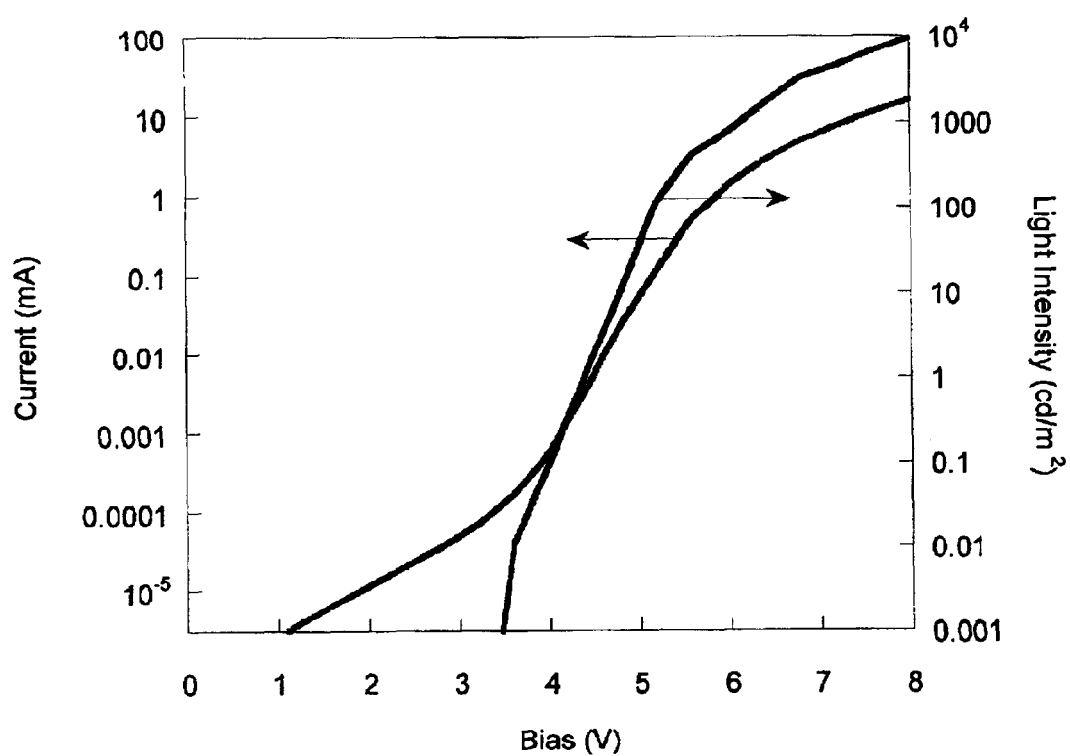
FIG. 2 is a graph illustrating the current-light-voltage response of an ITO/PEDOT/(DPA-PBP+BTIr)/Ca/Al polymer LED, described in Example 10.
Figure 3:
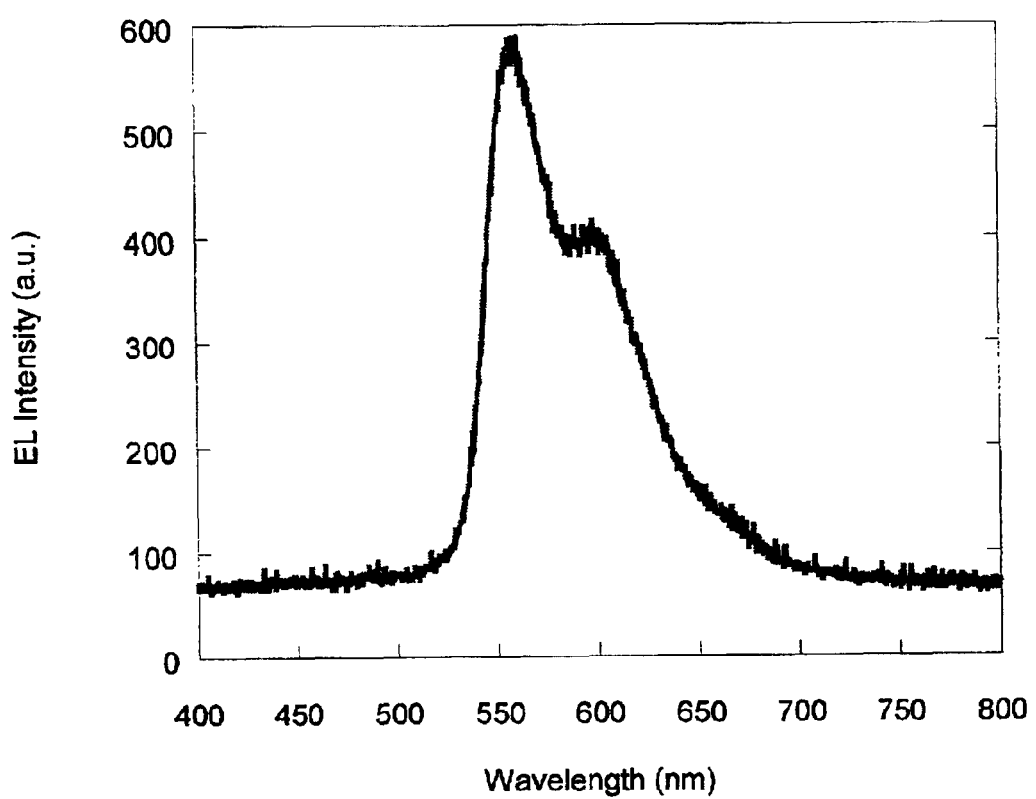
FIG. 3 illustrates the electroluminescent spectrum of the LED of FIG. 2.

DPA-PBP (poly(2-diphenylamino-biphenylene)) was employed as the host for iridium (III) bis(2-phenylbenzothiozolato-N,$C^2$)(acetylacetonate)(BTIr) doped PLEDs. Light emitting diodes were fabricated on a transparent, indium-tin oxide (ITO) coated glass substrate. A thin layer of a conducting polymer, poly(3,4-ethylenedioxythiophene) (PEDOT), was coated onto the ITO surface for a better interface. A thin layer of DPA-PBP doped with BTIR in chlorobenzene was then spin coated on the PEDOT/ITO. Then, thin layers of calcium and aluminum were evaporated successively at pressures around $10^{-6}$ Torr. When a voltage (0–8V) was applied across the ITO and Al layers, light was emitted and visible through the ITO side. FIG. 2 shows the current-light-voltage response observed. The device efficiency can reach up to 11cd/A with the device turn-on voltage lower than 4V. A clear emission from the dopant was observed (FIG. 3).

We claim:

1. A conjugated polymer comprised of monomer units having the structure of formula (I):

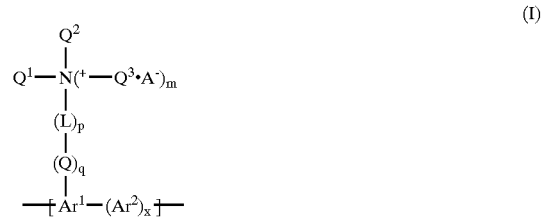

wherein:

Ar$^1$ and Ar$^2$ are independently selected from the group consisting of monocyclic, bicyclic and polycyclic arylene, heteroarylene, substituted arylene and substituted heteroarylene;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof;

Q is a heteroatom;

m is zero or 1;

p is zero or 1, and q is zero or 1, with the proviso that when p is zero, then q is zero;

x is zero or 1;

Q$^1$ and Q$^2$ are independently selected from the group consisting of H, aryl, heteroaryl, substituted aryl, substituted heteroaryl, alkyl, substituted alkyl, heteroalkyl, and substituted heteroalkyl, and Q$^3$ is selected from the group consisting of alkyl, substituted alkyl, heteroalkyl, and substituted heteroalkyl, with the proviso that when m is 1, Q$^1$ and Q$^2$ are other than H; and A$^-$ is a negatively charged counterion, and further wherein when p is zero, at least one of the following is satisfied:

(a) m is 1; and (b) at least one of Ar$^1$, Ar$^2$, Q$^1$, and Q$^2$ is substituted with a substituent selected from —SO$_3$H, —COOH, or —P(O)OH$_2$ groups; C$_1$–C$_{20}$ hydrocarbyl or heteroatom-containing C$_1$–C$_{20}$ hydrocarbyl substituted with one or more —SO$_3$H, —COOH, or —P(O)OH$_2$ groups; or with organic or inorganic sulfonate, carboxylate or phosphonate salts; or a combination thereof.

2. The polymer of claim 1, wherein the monomer units have the structure of formula (II):

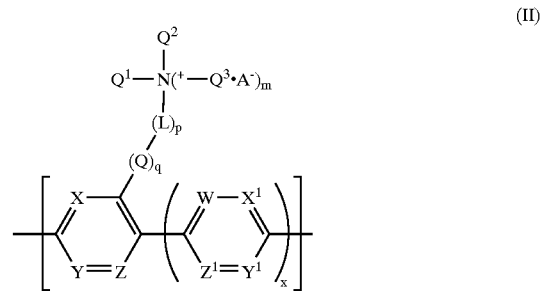

wherein W, X, Y, Z, X$^1$, y$^1$, and Z$^1$ are independently selected from the group consisting of N, CH, and CR$^1$, wherein R$^1$ is —(Q)$_q$—(L)$_p$—N(Q$^1$Q$^2$), —(Q)$_q$ —(L)$_p$—N(Q$^1$Q$^2$Q$^3$)$^+$A$^-$, —NO$_2$, sulfo (—SO$_3$H), carboxyl (—COOH), phosphono (—O(PO)(OH)$_2$), sulfonato (—SO$_2$O$^-$), carboxylato (—COO$^-$), phosphonato (—P(O)(O$^-$)$_2$), —CN, halo, C$_1$–C$_{20}$ hydrocarbyl, substituted C$_1$–C$_{20}$ hydrocarbyl, heteroatom-containing C$_1$–C$_{20}$ hydrocarbyl, or substituted heteroatom-containing C$_1$–C$_{20}$ hydrocarbyl, and further wherein Z and Z$^1$ may be linked to form a cyclic group.

3. The polymer of claim 2, wherein the monomer units have the structure (III):

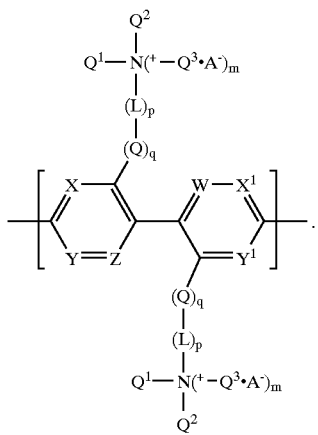

(III)

4. The polymer of claim 2, wherein the monomer units have the structure (IV):

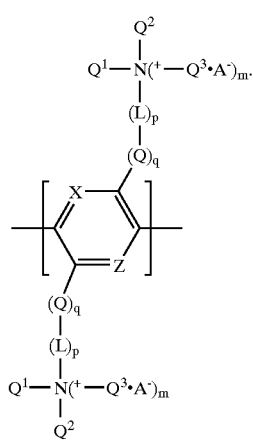

(IV)

5. The polymer of claim 1, wherein the monomer units have the structure (V):

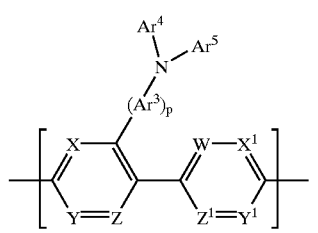

(V)

wherein p is zero or 1, Ar$^3$ is arylene, heteroarylene, substituted arylene or substituted heteroarylene containing one to three aromatic rings, Ar$^4$ and Ar$^5$ are independently selected from the group consisting of aryl, heteroaryl, substituted aryl and substituted heteroaryl containing one or two aromatic rings, and W, X, Y, Z, X$^1$, Y$^1$, and Z$^1$ are independently selected from the group consisting of N, CH, and CR$^1$, wherein R$^1$ is selected from the group consisting of: —(Ar$^3$)$_p$—Ar$^4$Ar$^5$; C$_1$–C$_2$ alkyl; C$_1$–C$_{12}$ alkyl; C$_1$–C$_{12}$ alkoxy; fluoro; cyano; nitro; sulfo; carboxyl; phosphono; sulfonato; carboxylato; and phosphonato; or —Z and Z$^1$ may be linked to form cyclic group.

6. The polymer of claim 5, wherein Ar$^3$, Ar$^4$ and Ar$^5$ are substituted with one or more substituents independently selected from the group consisting of C$_1$–C$_{12}$ alkyl, C$_1$–C$_{12}$ alkyl, C$_1$–C$_{12}$ alkoxy, fluoro, cyano, nitro, sulfonato, carboxylato, and phosphonato, and alkali metal sulfonato.

7. The polymer of claim 5, wherein Ar$^3$ is phenylene.

8. The polymer of claim 5, wherein W, X, Y, Z, X$^1$ and Y$^1$ are each CH.

9. The polymer of claim 5, wherein Z and Z$^1$ are CH or CR$^1$.

10. The polymer of claim 5, wherein at least one of W, X, Y, Z, Y$^1$ and Z$^1$ is N.

11. The polymer of claim 5, having the structure (VI):

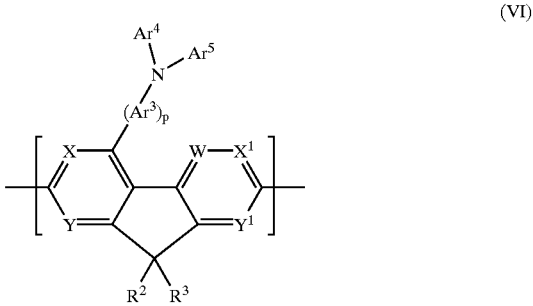

(VI)

wherein R$^2$ and R$^3$ are independently selected from the group consisting of hydrogen; linear and branched C$_4$–C$_{12}$; cyano-substituted C$_4$–C$_{12}$ alkyl containing 1 or 2 cyano groups; polyether substituents containing 2 to 5 ether oxygen atoms, with any two oxygen atoms separated by a C$_1$–C$_3$ alkylene linkage.

12. The polymer of claim 11, wherein R$^2$ and R$^3$ are the same.

13. The polymer of claim 11, wherein R$^2$ and R$^3$ are selected from the group consisting of hydrogen, linear or branched alkyl substituents containing 4 to 12 carbon atoms, cyano-substituted alkyl containing 1 or 2 cyano groups on a 4 to 10 carbon atom linear or branched alkyl group, and polyether substituents containing 2 to 5 ether oxygen atoms separated from one another by 1, 2, or 3 carbon alkylene bridges.

14. The polymer of claim 5, wherein R$^1$ is alkoxy.

15. The polymer of claim 5, wherein R$^1$ is a polyether substituent.

16. The polymer of claim 5, wherein Ar$^4$ and Ar$^5$ are independently selected from the group consisting of unsubstituted phenyl and phenyl substituted with at least one substituents selected from the group consisting of C$_1$–C$_{12}$ alkyl, fluorinated C$_1$–C$_{12}$ alkyl, C$_1$–C$_{12}$ alkoxy, fluoro, cyano, nitro, sulfonate, carboxylate and phosphonate groups.

17. The polymer of claim 1, in the form of a homopolymer.

18. A semiconductive composition comprising a polymer or copolymer according to claim 1.

19. In a conductive composition comprised of a doped conjugated polymer, the improvement comprising employing a polymer or copolymer comprised of monomer units having the structure of formula (I):

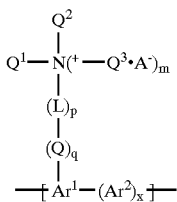

wherein:

Ar$^1$ and Ar$^2$ are independently selected from the group consisting of monocyclic, bicyclic and polycyclic arylene, heteroarylene, substituted arylene and substituted heteroarylene;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof;

Q is a heteroatom;

m is zero or 1;

p is zero or 1, and q is zero or 1, with the proviso that when p is zero, then q is zero;

x is zero or 1;

Q$^1$ and Q$^2$ are independently selected from the group consisting of H, aryl, heteroaryl, substituted aryl, substituted heteroaryl, alkyl, substituted alkyl, heteroalkyl, and substituted heteroalkyl, and Q$^3$ is selected from the group consisting of alkyl, substituted alkyl, heteroalkyl, and substituted heteroalkyl, with the proviso that when m is 1, Q$^1$ and Q$^2$ are other than H; and A$^-$ is a negatively charged counterion.

20. In an electroluminescence device having an organic light-emitting layer disposed between a hole-injecting electrode and an electron-injecting electrode, the improvement which comprises employing an organic light-emitting layer comprised of a polymer or copolymer according to claim 1.

21. In a field effect transistor comprising a gate electrode, a source electrode, a drain electrode and a channel electrically connecting the source electrode and the drain electrode, the improvement which comprises employing a channel comprising a polymer or copolymer comprised of monomer units having the structure of formula (I):

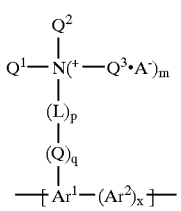

wherein:

Ar$^1$ and Ar$^2$ are independently selected from the group consisting of monocyclic, bicyclic and polycyclic arylene, heteroarylene, substituted arylene and substituted heteroarylene;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof;

Q is a heteroatom;

m is zero or 1;

p is zero or 1, and q is zero or 1, with the proviso that when p is zero, then q is zero;

x is zero or 1;

Q$^1$ and Q$^2$ are independently selected from the group consisting of H, aryl, heteroaryl, substituted aryl, substituted heteroaryl, alkyl, substituted alkyl, heteroalkyl, and substituted heteroalkyl, and Q$_3$ is selected from the group consisting of alkyl, substituted alkyl, heteroalkyl, and substituted heteroalkyl, with the proviso that when m is 1, Q$^1$ and Q$^2$ are other than H; and A$^-$ is a negatively charged counterion.

22. In a photodetector device comprised of a semiconductive layer disposed between first and second electrodes, and a means for detecting a photocurrent flowing between the electrodes, the improvement which comprises employing a semiconductive layer comprised of a polymer or copolymer comprised of monomer units having the structure of formula (I):

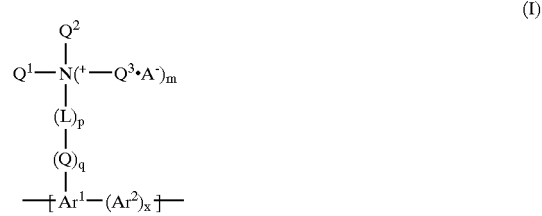

wherein:

Ar$^1$ and Ar$^2$ are independently selected from the group consisting of monocyclic, bicyclic and polycyclic arylene, heteroarylene, substituted arylene and substituted heteroarylene;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof;

Q is a heteroatom;

m is zero or 1;

p is zero or 1, and q is zero or 1, with the proviso that when p is zero, then q is zero;

x is zero or 1;

Q$^1$ and Q$^2$ are independently selected from the group consisting of H, aryl, heteroaryl, substituted aryl, substituted heteroaryl, alkyl, substituted alkyl, heteroalkyl, and substituted heteroalkyl, and Q$^3$ is selected from the group consisting of alkyl, substituted alkyl, heteroalkyl, and substituted heteroalkyl, with the proviso that when m is 1, Q$^1$ and Q$^2$ are other than H; and A$^-$ is a negatively charged counterion.

23. In a photovoltaic device useful for the generation of electrical power comprised of a first electrode, a semiconductive layer provided on the first electrode, and a second electrode provided on the light incidence surface of the semiconductive layer, the improvement which comprises employing a semiconductive layer comprised of the a polymer or copolymer comprised of monomer units having the structure of formula (I):

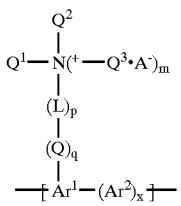

(I)

wherein:
- Ar¹ and Ar² are independently selected from the group consisting of monocyclic, bicyclic and polycyclic arylene, heteroarylene, substituted arylene and substituted heteroarylene;
- L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof;
- Q is a heteroatom;
- m is zero or 1;
- p is zero or 1, and q is zero or 1, with the proviso that when p is zero, then q is zero;
- x is zero or 1;
- Q¹ and Q² are independently selected from the group consisting of H, aryl, heteroaryl, substituted aryl, substituted heteroaryl, alkyl, substituted alkyl, heteroalkyl, and substituted heteroalkyl, and Q³ is selected from the group consisting of alkyl, substituted alkyl, heteroalkyl, and substituted heteroalkyl, with the proviso that when m is 1, Q¹ and Q² are other than H; and
- A⁻ is a negatively charged counterion.

24. In a light-emitting electrochemical cell comprised of a conductive transparent or semitransparent substrate, a thin film or a conjugated polymer and an ionizable species deposited on the substrate, and an electrode deposited on the thin film, the improvement which comprises employing a polymer or copolymer comprised of monomer units having the structure of formula (I):

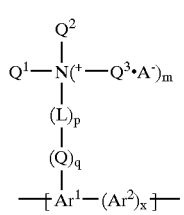

(I)

wherein:
- Ar¹ and Ar² are independently selected from the group consisting of monocyclic, bicyclic and polycyclic arylene, heteroarylene, substituted arylene and substituted heteroarylene;
- L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof;
- Q is a heteroatom;
- m is zero or 1;
- p is zero or 1, and q is zero or 1, with the proviso that when p is zero, then q is zero;
- x is zero or 1;
- Q¹ and Q² are independently selected from the group consisting of H, aryl, heteroaryl, substituted aryl, substituted heteroaryl, alkyl, substituted alkyl, heteroalkyl, and substituted heteroalkyl, and Q³ is selected from the group consisting of alkyl, substituted alkyl, heteroalkyl, and substituted heteroalkyl, with the proviso that when m is 1, Q¹ and Q² are other than H; and
- A⁻ is a negatively charged counterion.

25. In an electrochemical sensor comprising a counter electrode, a working electrode, and a means for applying or measuring an electrical potential between the working and counter electrodes, the improvement which comprises employing a polymer or copolymer comprised of monomer units having the structure of formula (I):

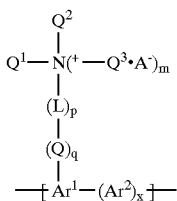

(I)

wherein:
- Ar¹ and Ar² are independently selected from the group consisting of monocyclic, bicyclic and polycyclic arylene, heteroarylene, substituted arylene and substituted heteroarylene;
- L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof;
- Q is a heteroatom;
- m is zero or 1;
- p is zero or 1, and q is zero or 1, with the proviso that when p is zero, then q is zero;
- x is zero or 1;
- Q¹ and Q² are independently selected from the group consisting of H, aryl, heteroaryl, substituted aryl, substituted heteroaryl, alkyl, substituted alkyl, heteroalkyl, and substituted heteroalkyl, and Q³ is selected from the group consisting of alkyl, substituted alkyl, heteroalkyl, and substituted heteroalkyl, with the proviso that when m is 1, Q¹ and Q² are other than H; and
- A⁻ is a negatively charged counterion.

26. A cavity emission electroluminescent device, comprising:
- a hole-injection electrode layer;
- an electron-injection electrode layer;
- a dielectric layer interposed between the hole-injecting and electron-injecting electrode layers; and
- a cavity extending through at least the dielectric layer and one of the electrode layers and having an interior cavity surface comprising a hole-injection electrode region, and an electron-injection electrode region and a dielectric region,
- wherein an electroluminescent coating material comprising a polymer or copolymer is in electrical contact with the hole-injection and electron-injection regions of the interior cavity surface,
- and wherein said polymer or copolymer is comprised of monomer units having the structure of formula (I):

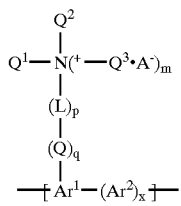

(I)

wherein:

Ar$^1$ and Ar$^2$ are independently selected from the group consisting of monocyclic, bicyclic and polycyclic arylene, heteroarylene, substituted arylene and substituted heteroarylene;

L is alkylene, alkenylene, substituted alkylene, substituted alkenylene, heteroalkylene, heteroalkenylene, substituted heteroalkylene, substituted heteroalkenylene, arylene, heteroarylene, substituted arylene, substituted heteroarylene, or a combination thereof;

Q is a heteroatom;

m is zero or 1;

p is zero or 1, and q is zero or 1, with the proviso that when p is zero, then q is zero;

x is zero or 1;

Q$^1$ and Q$^2$ are independently selected from the group consisting of H, aryl, heteroaryl, substituted aryl, substituted heteroaryl, alkyl, substituted alkyl, heteroalkyl, and substituted heteroalkyl, and Q$^3$ is selected from the group consisting of alkyl, substituted alkyl, heteroalkyl, and substituted heteroalkyl, with the proviso that when m is 1, Q$^1$ and Q$^2$ are other than H; and A$^-$ is a negatively charged counterion.

* * * * *